United States Patent [19]

Dufour et al.

[11] Patent Number: 4,520,454

[45] Date of Patent: May 28, 1985

[54] MAKEREADY SYSTEM

[75] Inventors: Charles H. Dufour; Jonathan G. Newman, both of Westerly, R.I.

[73] Assignee: Harris Corporation, Melbourne, Fla.

[21] Appl. No.: 494,671

[22] Filed: May 13, 1983

Related U.S. Application Data

[63] Continuation of Ser. No. 967,697, Dec. 8, 1979, abandoned.

[30] Foreign Application Priority Data

Dec. 9, 1977 [DE] Fed. Rep. of Germany ....... 2754941

[51] Int. Cl.[3] .......................... G06F 3/12; G06F 3/14

[52] U.S. Cl. .................................................... 364/900

[58] Field of Search ... 364/200 MS File, 900 MS File, 364/300, 518, 522, 523

[56] References Cited

U.S. PATENT DOCUMENTS

| | | | |
|---|---|---|---|
| 4,064,395 | 12/1977 | Schubeler et al. | 364/900 |
| 4,078,249 | 3/1978 | Lelke et al. | 364/200 |
| 4,179,735 | 12/1979 | Lodi | 364/200 |

*Primary Examiner*—Raulfe B. Zache
*Assistant Examiner*—David Y. Eng
*Attorney, Agent, or Firm*—Yount & Tarolli

[57] ABSTRACT

Apparatus and method are disclosed for making ready a multi-unit, multi-web printing press. Data is entered into a computer memory representing the number of sections of a publication to be printed, the number of pages for each section and which pages of each section are to be printed in one or more colored inks. An acceptable web layout pattern and acceptable page printing plate locations on the various plate cylinders of the press are determined from the inputted and previously stored data. A readout is presented providing information as to the acceptable web layout pattern and the correct page printing plate positions.

23 Claims, 13 Drawing Figures

MAKEREADY SYSTEM

This application is a continuation of application Ser. No. 967,697, filed Dec. 8, 1979 now abandoned.

BACKGROUND AND FIELD OF THE INVENTION

This invention is directed to the art of printing and, more particularly, to a press makeready system.

The invention will be described in conjunction with making ready a web fed newspaper or other commercial press having several printing units; although, it is to be appreciated that the invention may be employed in making ready various other types of printing units.

The production of a newspaper, magazine, book, periodical, or any type of publication requires a makeready operation during which the various printing units are prepared for a subsequent run operation. Among the various steps involved includes webbing the press and positioning the various printing plates on the correct plate cylinders. The determination as to how the press is to be webbed and which printing plates are to be placed on which plate cylinders is a laborious time consuming procedure, detracting from the productivity of the press.

In order to facilitate an understanding of the background of the invention, reference is made to the schematic illustration of a press in FIG. 1. This press has seven printing units 10, 12, 14, 16, 18, 20 and 22. This description outlines a newpaper press arrangement. However, this invention can apply to any other type of commercial or publication press. Press units 10 through 16 are located to the left of a folder 24. Webs on press units 10 through 16 move to the right from the press units to the folder and the webs on the three units to the right of the folder move toward the left to the folder. In common terminology, the units designated as right hand or left hand depend upon the direction of movement of the web to the folder as viewed from the workside of the press. Accordingly then, units 10 through 16 are termed right hand units and units 18 through 22 are termed left hand units.

In the illustrated press arrangement, six webs are handled by the press. These are webs W1 through W6 which are webbed through the various press units, as shown. Each press unit has two plate cylinders which are adapted to receive the page printing plates for four pages of printing across the width of the press with each plate cylinder accommodating two page sets of plates around the periphery of the cylinder. The printing units illustrated have upper and lower plate cylinders so as to be capable of printing on both sides of the web. For example, press unit 10 includes upper and lower plate cylinders 30 and 32, each of which is adapted to carry printing plates. The web can be passed between two blanket cylinders 34 and 36 respectively associated with plate cylinders 30 and 32. A web passing between blanket cylinders 34 and 36 may be printed simultaneously on the top and bottom sides of the web. This then provides two printing couples. Also, a web may be passed between blanket cylinder-plate cylinder pair and then through the blanket to blanket pair and this also provides two printing couples. Printing units 10, 14, 18 and 22 all take the form as shown with respect to printing unit 10. However, printing units 12, 16, and 18 are provided with an additional capability in the form of a half deck. Half decks 40, 42 and 44 are carried on printing units 12, 16 and 20, respectively. A half deck serves to print on only one side of the web to provide one printing couple. As shown with reference to printing unit 12, a half deck includes a plate cylinder 46 which is adapted to carry printing plates together with an impression cylinder 48. The impression cylinder serves as a backing for the printing operation as the web passes between the plate cylinder and the associated impression cylinder.

Consequently then, a printing unit such as unit 10 can be used to print on two sides of a single web or to make two different printings on a single side of one web, whereas the printing unit having a half deck such as printing unit 12 can also provide an additional printing on one side of a web. Half decks are arranged so that the webbing may be passed either in the direction toward the folder or away from the folder, as indicated by the examples with reference to printing units 12 and 20.

As is well known in the art, during the printing of a newpaper, the web will be severed into ribbons so as to provide ribbons which are two pages wide for folding and assembly purposes. Each ribbon will ultimately be severed into sections of two pages wide with a fold to provide a one page wide newpaper. In a simple four page newpaper, the complete newspaper would be printed by printing pages 1 and 4 on one side of the web on one plate cylinder and pages 2 and 3 on the opposite side of the web. This requires in the press configuration illustrated in FIG. 1 only a single half web with only one printing unit which would simultaneously print on opposite sides of the web. The printing plates for pages 1 and 4 might be located on the upper plate cylinder in a blanket to blanket configuration and the printing plates for pages 3 and 4 may be on the lower plate cylinder. However, as additional pages are to be printed for the newpaper, or a newspaper section, additional webs (or half webs) may be required and additional printing units may be required. For example, when printing an 8 page newpaper section, the plates in a blanket to blanket printing configuration would have the printing plates for pages 1 and 8 adjacent to each other on one side of the web on the upper plate cylinder and the plates for pages 2 and 7 would be adjacent to each other on the other side of the web on the lower plate cylinder. This defines a sheet having two pages on each side which is folded and will have inserted into it to achieve the 8 page newpaper, a second ribbon (half web) which has pages 3 and 6 adjacent to each other on the top side of the second web and pages 4 and 5 adjacent to each other on the bottom side of the second web. When this two page wide second ribbon is severed and folded into the section containing pages 1, 2, 7 and 8, all the pages will be in succession.

From this simplified explanation, it can be seen that as the number of pages in a section increases, the location of the printing plates and the number of webs required becomes more complicated. This provides difficulties in properly locating the page plates on the proper printing cylinders and in the proper position on the printing cylinders of the proper printing units to assure that the webs can be lead to the folder so that the sections may be properly assembled.

The webbing of the press and the correct location of the printing plates is further complicated when certain pages of a section are to have color different from the color for the remainder of the newspaper. For example, newspapers are customarily printed in black ink. If a color is to be added to the page containing black ink, then that page requires that a printing couple be dedicated to that color. Thus, if four colors are to be printed then four printing units, in the blanket to blanket configuration, will be required. This is true even if four different colors are to be printed on four different pages. Consequently then, when color (in addition to black ink) is to be printed on different pages, it will facilitate webbing the press if the color appears on the pages which would normally be associated with each other, and as we have already seen, associated pages will depend on the total number of pages to be printed for each newspaper section.

From the foregoing, it can be seen that the web layout pattern as well as the positioning of the printing plates on the various printing units for a given press description (configuration) and preferred mode of operation will be dependent upon the number of sections to be printed, the number of pages in each section, and which pages in each section are to be printed in color. The press description is usually fixed for a press installation. This would include the number and location of the printing units, the number and location of half decks, the number of formers, and their location, the number of four color units, the number and location of angle bar sections, the number and location of bay window arrangements, and whether or not double delivery or single delivery is to be employed. The preference description is usually fixed for a printer and this would include whether the operation is to be run without quarter webs and what the run mode shuld be (straight or collect). The various jobs will cause variations in webbing and plate location dependent upon the variables: number of sections, pages per section and color information.

SUMMARY OF THE INVENTION

In accordance with the present invention, apparatus and method are provided for use in providing web layout instructions for use in webbing and plate positioning a multiweb, multiprinting unit, printing press. A read/-write memory provides for storage and retrieval of data. Data is entered into the read/write memory respecting the number of sections to be printed, the number of pages in each section and which pages in each section are to be printed in one or more colored inks. Memory means also stores data respecting various acceptable products for the printing press in a product index. The memory means is interrogated for the web layout instructions to be used by the press in dependence upon the data entered respecting the number of sections to be printed, the number of pages in each section and the color data information until an acceptable web layout instruction is determined. The acceptable web layout instructions are then outputted as by a video display and/or a printed display for use in webbing the press.

In accordance with another aspect of the present invention, memory facilitates store data respecting acceptable plate positions for the various pages to be printed. Under programmed instructions, a computer searches the acceptable combinations of plate positions and provides output instructions respecting the plate positions to be used. This information is then outputted as by a video display and/or a print out.

BRIEF DESCRIPTION OF THE DRAWINGS

The foregoing and other objects and advantages of the invention will become more readily apparent from the following description of the preferred embodiment of the invention as taken in conjunction with the accompanying drawings which are a part hereof and wherein.

DETAILED DESCRIPTION

Figure 1:
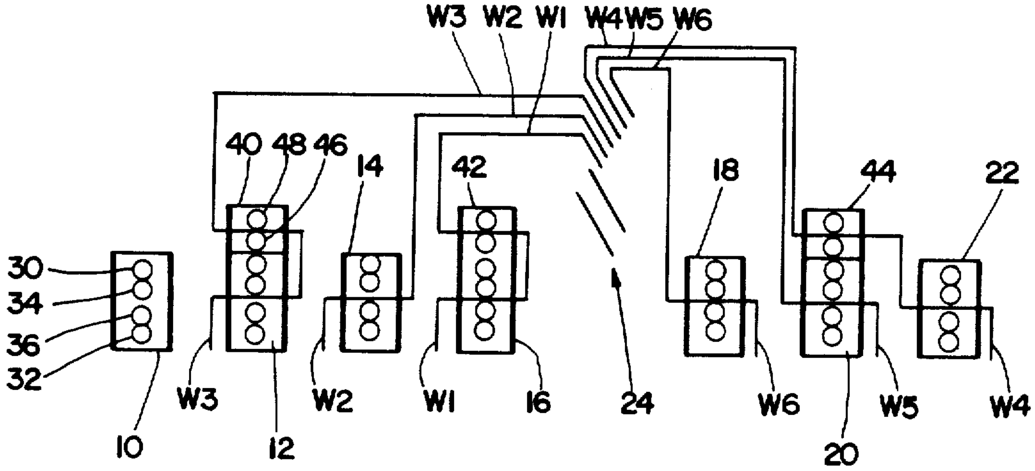
FIG. 1 is a schematic illustration of a multi-unit printing press.
Figure 2:
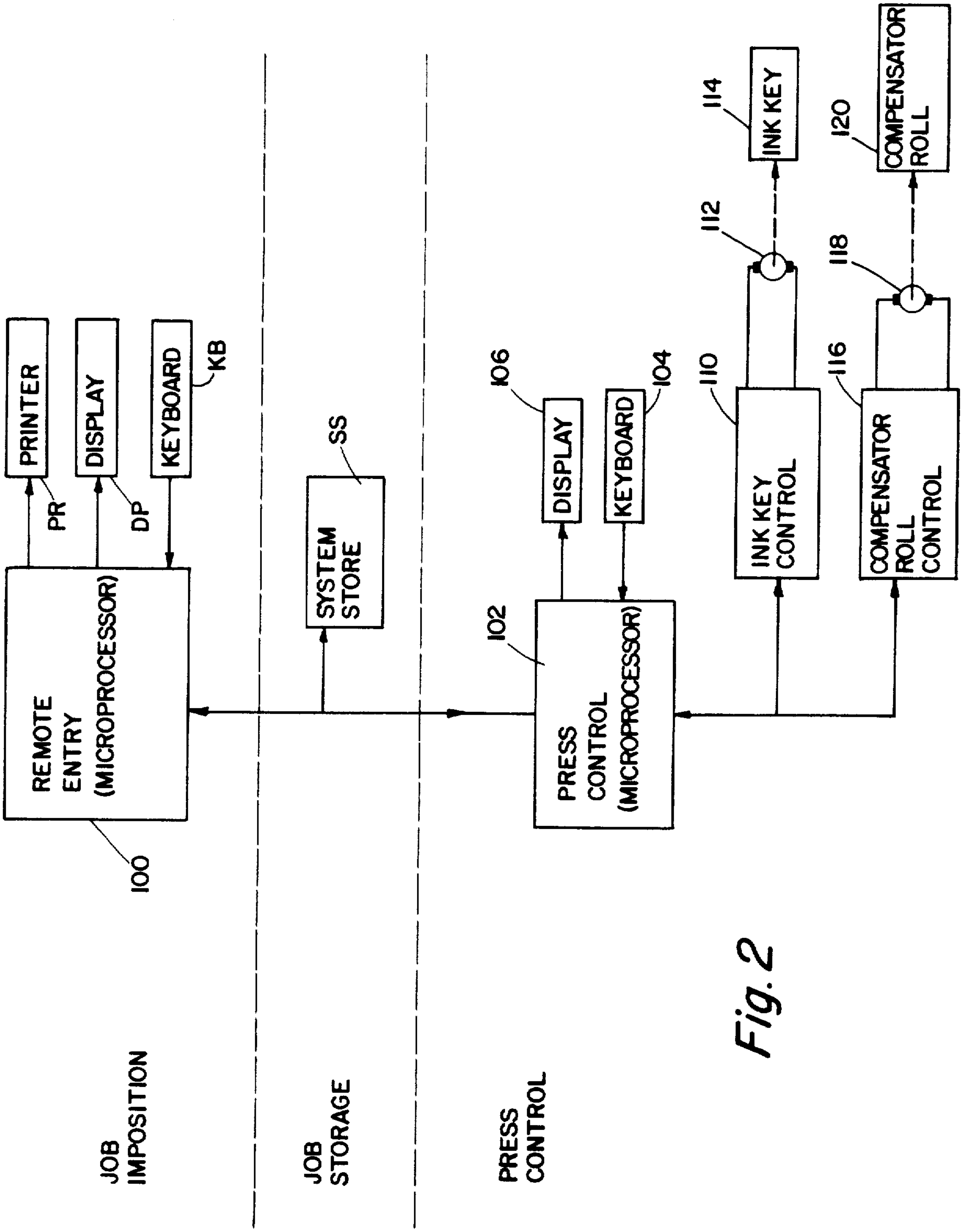
FIG. 2 is a schematic-block diagram of the make-ready system as applied to both making ready and running a press.

In accordance with the present invention, a press such as the 7 printing unit press of FIG. 1 is made ready for press operations with the aid of an operator actuated remote entry console 100 (see FIG. 2). This console has circuitry which performs job imposition in that through an interactive answer and question activity with the operator a printing job will be imposed, requiring a particular web layout and a particular positioning of the printing plates. As will be brought out in greater detail hereinafter, data is entered into the remote entry console by way of an operator actuated keyboard in response to queries made by the console and viewed on a video display screen. These question-answer activities continue until the operator input has been completed. For example, the system may know that it cannot print 20 pages in sections A and E of an 8 section paper and in this case, the video display will so indicate and stop accepting data. This tells the operator to alter the input in some manner or that the job cannot be done. Preferably, the console incorporates a microprocessor provided with a keyboard KB for data entry and a video display DP to provide video outputs from the microprocessor, including questions for the operator, web layout graphics and alphanumerical characters representing product details. This will all be discussed in greater detail hereinafter. The web layout and the product detail provided by display DP may also be outputted as with a printer PR so that a permanent copy may be obtained.

Preferably, the remote entry console 100 incorporates a microprocessor, although other data processing facilities may be used, such as a minicomputer or a main frame computer. The remote entry microprocessor together with the keyboard KB and display DP are conventional in the art and, for example, may take the form of a product known as Intecolor model 8051 desk top computer. This microprocessor (sometimes referred to as a microcomputer) is based on an Intel Model 8080 central processing unit (CPU). Microprocessors based on the Intel CPU 8080 are well known in the art and, hence, suitable microprocessors may be obtained from various suppliers other than Intecolor. For an understanding of such a microprocessor, reference is now made to FIG. 3 which illustrates a common bus structure including an address bus AB, a data bus DB and a control bus CB. The address bus may, for example, be a 16 bit bus whereas the data bus may be an 8 bit bus. The control bus has a variable number of control lines dependent upon the number of control commands and the like being employed. The central processing unit CPU together with suitable interfacing is connected to the common bus, as illustrated. Whereas only single lines are illustrated it is to be appreciated that address information is provided with a 16 bit bus and data by an 8 bit bus to the common bus structure. As is conventional, the internal control of the CPU is controlled by microinstructions contained in an internal read only memory within the CPU or, if necessary, may be contained in an external read only memory (ROM) or in an external programmable read only memory (PROM). Such a memory is illustrated as memory M-1 on the bus structure. An additional memory M-2 together with its interfacing is also connected to the bus structure. Memory M-2 is a read/write random access memory (RAM). The internal control microinstructions are modified as required by the external read only memory M-1. Data is entered into the random access memory M-2 from the keyboard KB by way of an input/output control IO. In addition to such an input peripheral as a keyboard, the input/output control IO also provides communication with other peripherals, such as the printer PR and the video display DP (see FIG. 2). The control bus conventionally carries various control signals for enabling various operations. For example, when the CPU addresses memory M-1 a READ signal is supplied to the control bus CB. This is directed to the memory M-1 so that the data at a particular address therein, as determined by the 16 bit address on the address bus AB, will be read out and placed on the data bus DB. Thus, the CPU in addressing memories M-1 and M-2 may, by way of the control bus, cause either a READ operation or a WRITE operation to take place at the address placed on the address bus AB. Similarly, the CPU may address one of the input or output peripherals by way of the input/output control IO.

Figure 3:
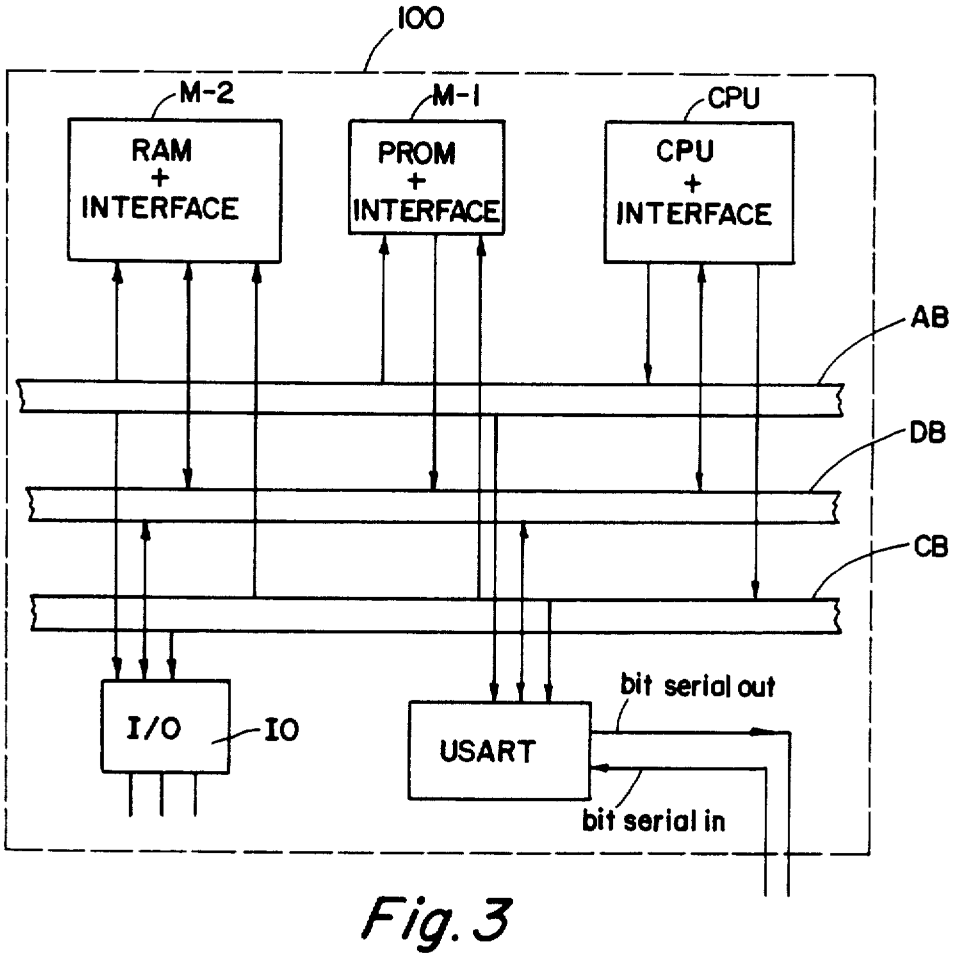
FIG. 3 is a schematic-block diagram of the bus structure in the remote entry console.

The remote entry console 100 may be operated in a stand alone function in which case the memory facilities provided by the random access memory M-2 should be sufficient to store data respecting product details and product descriptions for several jobs. If the memory capacity is not sufficient, then the data may be stored on a mass storage device, such as a floppy disc and the like. It is also contemplated that the remote entry console operate interactively within a system so that, for example, as shown in FIG. 2 data may be forwarded to a system storage SS. This may take the form of a large disc memory with a suitable disc drive. Communications with the system store may be had in various ways. It is preferred in the embodiment illustrated that the parallel data at the microprocessor be converted to bit serial by way of a universal synchronous/asynchronous receiver transmitter USART. This is connected to the common bus structure as shown in FIG. 3 and transmits and receives data and address information in bit serial fashion to and from the system store SS. Several jobs may be stored in memory at the system store and called up by the CPU as desired by addressing the system store by way of the USART. Thus the system store in the system of FIG. 2 serves the function as a job storage device. The system store is connected by a series bus to a press control console 102. The press control console 102 may also be a microprocessor of the nature illustrated in FIG. 3 and is also provided with parallel to serial communications device, such as a USART. As in the case of the remote entry console, the press control console may have data entered into its memory by way of a keyboard 104 and output data to a suitable video display 106. With these facilities, an operator located in the press control area may operate his press control console 102 to call up a job from the system store and have it displayed on the video display 106. If the operator realizes that the particular job cannot be performed as, for example, because of a malfunctioning press unit he can communicate with the remote entry console by way of the series bus to indicate that the job cannot be performed and the operator at the remote entry console must vary the inputs for a job imposition or the job cannot be performed.

Because of the particular job to be performed, some variations may be required from the preset conditions of the press. For example, the operator at the press control module 102 may determine that various ink keys must be adjusted for the particular job. The press control module communicates with an ink key control 110 for commanding adjustments to be made at one or more ink keys. The ink key control, in turn, energizes a suitable motor 112 to drive an associated ink key 114 to accomplish the ink key adjustment. In performing this task, the operator at the press control module 102 is provided with the product details and this includes details as to the plate positions on the various cylinders to accomplish the particular job involved. It is this knowledge that is used in deciding that various ink keys will require adjustment. The operator is also provided with a product description from the system store for the job under consideration. The product description provides the operator with web layout information for the particular press. From this knowledge, the operator can cause adjustments in the compensator rolls for the different types of layouts to be performed. The press control module 102 communicates with a compensator roll control 116 and this, in turn, operates a suitable motor 118 to drive a selected compensator roll 120 in the proper direction to achieve compensator adjustment.

KEYBOARD

Having generally described the system as illustrated in FIG. 2, attention is now directed more specifically to the remote entry console. The architecture of the microprocessor employed in the remote entry console has been described in conjunction with the common bus structure illustrated in FIG. 3. The keyboard KB for the remote entry console is illustrated in detail in FIG. 4. This keyboard includes a standard ASCII keyboard section 130 which is used for entering alphanumeric data. In addition, the keyboard KB includes 12 command keys referred to hereinafter as imposition keys. Each is momentary actuated key and its actuation causes a coded command to be entered. Each of these keys and its function is described below.

NEW JOB (key 132)—momentary depression of this key is used to initiate entry of a new product description.

PRODUCT INDEX (key 134)—momentary actuation of this key is used to display the product file index.

IMPOS (key 136)—momentary actuation of this key runs the job description being displayed on the video display DP through the job imposition program.

STORE (key 138)—momentary actuation of this key causes the product description being displayed to be entered into the product file.

DELETE (key 140)—momentary actuation of this key deletes the product description being displayed from the product file.

LAST LINE (key 142)—momentary actuation of this key deletes the product description being displayed from the product file.

LAST LINE (key 142)—momentary actuation of this key moves the cursor on the display screen in an upper direction by one line.

NEXT FIELD (key 144)—momentary actuation of this key causes next question to be displayed.

NEXT LINE (key 146)—momentary actuation of this key causes the cursor on the display screen to move down by one line.

NEXT PAGE (key 148)—momentary actuation of this key will cause the next page (if any) of the current display to be displayed on the display screen.

YES (key 150)—momentary actuation of this key causes an affirmative answer to be entered in response to a displayed question.

NO (key 152)—momentary actuation of this key causes a negative entry to be made in response to a displayed question.

SELECT (key 154)—momentary actuation of this key causes the job product description to be displayed corresponding to the product file index line indicated by the cursor.

The imposition keys discussed above and their function will become more readily understood from the following descriptions herein.

VIDEO DISPLAYS AND PRINTOUTS

Figure 5:
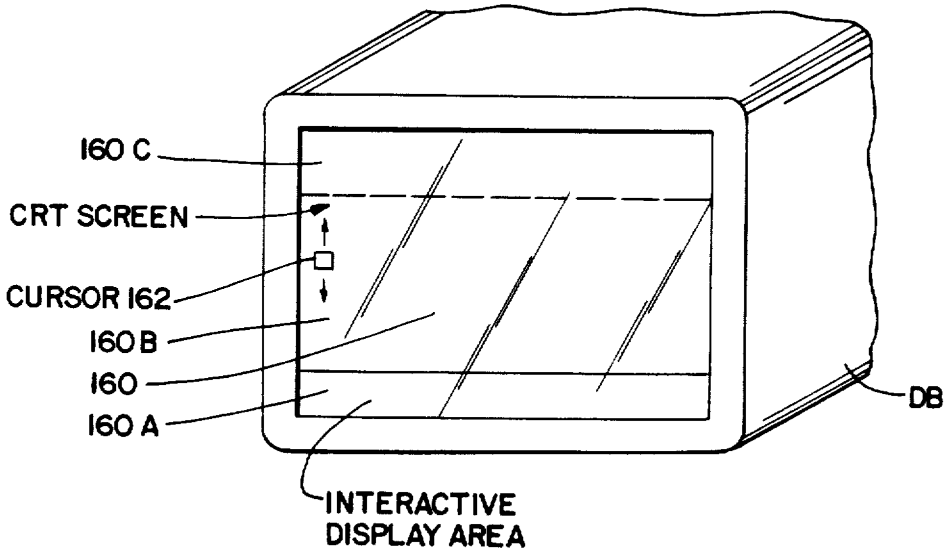
FIG. 5 is an illustration of the video display portion of the remote entry console.

Reference is now made to FIG. 5 which schematically illustrates the video display DP. This is a conventional display and is provided as a part of the Intecolor 8051 dest top computer. This includes a conventional CRT display screen and, for example, has a display area of approximately 120 square inches with a diagonal measure being on the order of 19 inches. Alphanumeric characters as well as graphical images may be displayed. The character format provides the capacity to display 80 characters per horizontal line with 48 lines possible on the display screen. Character style provides for 64 ASCII characters, each on a 5 by 7 dot matrix. 32 ASCII lower case characters with descenders may also be displayed. The CRT screen 160 may be considered as being divided into three display areas 160*a*, 160*b* and 160*c*. Area 160*a* may be considered as an interactive display area because it is in this area that alphanumerics are displayed in a question/answer activity between the operator and the computer. Area 160*c* is dedicated to a display of alphanumeric characters. Area 160*b* may be used in conjunction with area 160*c* for a display of alphanumerics or may be used for providing a graphics display. The specific types of displays will be described later.

The video display has the capability of providing a display of a cursor 162. The particular cursor involved is a white blinking, overscore cursor. The cursor is used in conjunction with selecting a product description from the display of a product file index. The cursor will always be located on the left side of the screen immediately to the left of a product number identification. Reference is now made to Table I which appears below.

TABLE I

PRODUCT FILE INDEX

| PRODUCT | # PAGES | # SECTIONS | RUN MODE | 4-C PGS | 2-C PGS | SPOT-C PGS |
|---|---|---|---|---|---|---|
| 0 | 032 | 4 | COLLECT | 01 | 00 | 00 |
| 1 | 056 | 6 | COLLECT | 01 | 00 | 01 |
| 2 | 015 | 1 | STRAIGHT | 03 | 00 | 00 |
| 3 | 028 | 2 | COLLECT | 00 | 00 | 01 |
| 4 | 048 | 2 | COLLECT | 00 | 00 | 00 |
| 5 | 112 | 8 | COLLECT | 00 | 00 | 00 |
| 6 | 015 | 1 | STRAIGHT | 00 | 00 | 04 |
| 7 | 032 | 4 | COLLECT | 02 | 00 | 00 |
| 8 | 048 | 4 | COLLECT | 00 | 00 | 00 |
| 9 | 032 | 4 | COLLECT | 00 | 00 | 00 |

The cursor 162 is used when the product index (Table I) is being displayed on the CRT screen 160. The cursor will initially be positioned immediately to the left of the first job description in the product index. The cursor 162 may be moved upwardly or downwardly one line at a time by actuating keys 142 and 146. As previously explained, each momentary actuation of key 142 moves the cursor up one line, whereas each actuation of key 146 moves the the cursor down one line. For a clear understanding of this, reference is now made to Table II which appears below.

TABLE II

Product Index Routine

| Key | Result |
|---|---|
| PRODUCT INDEX | Display of Product Index |
| NEXT LINE | Moves cursor down one line. |
| LAST LINE | Moves cursor up one line. |
| SELECT | Selects product across from cursor and Displays web routes |
| NEXT PAGE | Displays paginator for product selected |
| DELETE | Clears product across from cursor out of memory |
| P | Prints Display |

For this discussion, it is assumed that various jobs and their descriptions have already been entered into the remote console and stored. How such jobs and product descriptions were entered will be discussed at later point. The computer is programmed so that if an operator wants to see a product index such as that illustrated in Table I, the operator merely momentarily actuates the product index key 134. The result of this actuation will cause a video display to be presented in areas 160*b* and 160*c* of the CRT screen 160. Table I is representative of the alphanumerics that will be visually displayed on the screen. The operator viewing the contents will then see the information in terms of the product identification number (refer to Table I), the number of pages to be printed, the number of sections to be printed, the run mode (whether it be collect or straight), the number of four color pages (black and three other colors), the number of two color pages and the number of spot color pages (one color in addition to black.

Figure 6:
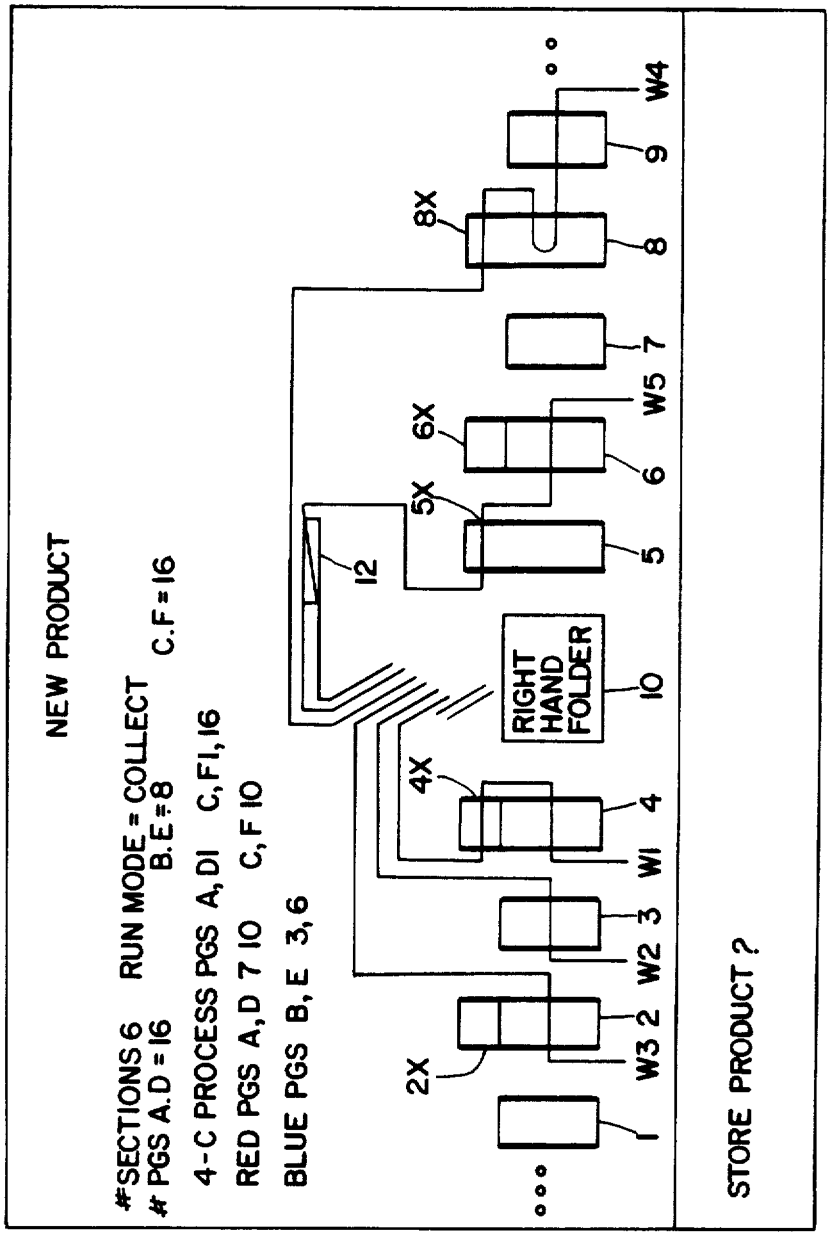
FIG. 6 is an illustration of the CRT screen showing alphanumeric and graphic information.

The purpose in the operator calling for visual display of the product index is to determine whether one of the jobs stored in memory is identical or quite similar to that which he wishes to perform. If the operator is not satisfied with the job descriptions provided on the product index file on the screen and wants to see if other jobs are in storage then he momentarily actuates the NEXT PAGE key 148 which will cause additional jobs to be described in the manner similar to that as shown in Table I. This will continue within the memory capacity employed. In the embodiment being discussed, the product index may provide product descriptions of the nature shown in Table I for one hundred different products. If the operator sees a product description that appears to match that which he would like to perform then he positions the cursor 162 to the proper line. For example, with reference to Table I, the operator may want more details of product No. 5. In this case he would actuate the NEXT LINE key 146 five times so that the cursor would move downwardly from its home position at the left of product 0 to the left of product 5 (refer to Table I). As shown there, that particular product has 112 pages with 8 sections and was run in the collect mode. No color pages are involved. The operator can now obtain more information about that product by momentarily actuating the SELECT key 154. This will cause a product description to be displayed on the face of the CRT screen 160. The display will appear in a manner similar to that as illustrated in FIG. 6. As shown there the display includes an alphanumeric display of product information together with a graphical display showing a web layout pattern for the press configuration under consideration. FIG. 6 will be described in greater detail hereinafter with respect to the generation of a new product description and is presented here only as an example. Actually, when calling up an old product from the product index the legend at the top of the screen in area 160*c* will appear as PRODUCT 5 DETAILS. These details would then correspond with those shown for product 5 in the product index of Table I and would not correspond with those illustrated in FIG. 6 (which are illustrated in conjunction with an example to be described hereinafter). Additionally, area 160*a* will be blank and will not include the legend STORE PRODUCT? as shown in FIG. 6.

The operator may desire additional details with respect to positioning or pagination. For these product details, the operator will now actuate the NEXT PAGE key 148. This will cause a display to appear on the CRT screen to include the information as illustrated in Table III. This table is produced below:

TABLE III

| PRODUCT DETAILS | | | | | | | | | | | |
|---|---|---|---|---|---|---|---|---|---|---|---|
| Unit | GS | U1 | L1 | L2 | U2 | WS | U3 | L3 | L4 | U4 | WEB |
| 1 | 1.5 | 16 | 15 | 2 | 16 | 3.7 | 16 | 15 | 2 | 1 | 4 |
| 2 | 1.5 | 14 | 13 | 4 | 14 | 3.7 | 14 | 13 | 4 | 3 | 5 |
| 3 | 1.5 | 12 | 11 | 6 | 12 | 3.7 | 12 | 11 | 6 | 5 | 6 |
| 4 | 1.5 | 10 | 9 | 8 | 10 | 3.7 | 10 | 9 | 8 | 7 | 7 |
| 5 | 2.6 | 12 | 11 | 2 | 12 | 4.8 | 12 | 11 | 2 | 1 | 1 |
| 6 | 2.6 | 10 | 9 | 4 | 10 | 4.8 | 10 | 9 | 4 | 3 | 2 |
| 7 | 2.6 | 8 | 7 | 6 | 8 | 4.8 | 8 | 7 | 6 | 5 | 3 |
| PAGINATION | | | | | | | | | | | |

This table is presented for a seven unit press and provides information for the operator as to where the page printing plates are to be located on each printing unit. The meaning of all of the legends shown in this table will be understood from the discussions given in greater detail with respect to the new job routine discussed in conjunction with Table IV.

In the event that the operator wants a printout of the information shown on the display screen he merely actuates the alphanumerical key P, 170, which is located on the standard alphanumeric keyboard in section 130. If the operator decides that none of the products shown in the product index are appropriate for the job to be performed and he also has noted that the memory capacity is full (all one hundred jobs are stored), then prior to starting a new job routine he will delete one of the product descriptions from memory. This is done by positioning the cursor on the product index display to the product description to be deleted. That product is then deleted from memory as a result of a momentary actuation of the DELETE key 140.

NEW JOB ROUTINE

In commencing a new job description the operator will momentarily actuate the NEW JOB key 132. Actuation of this key will cause the legend #SECTIONS=? to be displayed on the interactive display area 160*a* of the CRT screen. Other than this display the screen is now blank and we are commencing the description of a new job or new product.

Figures 7A, 7B:
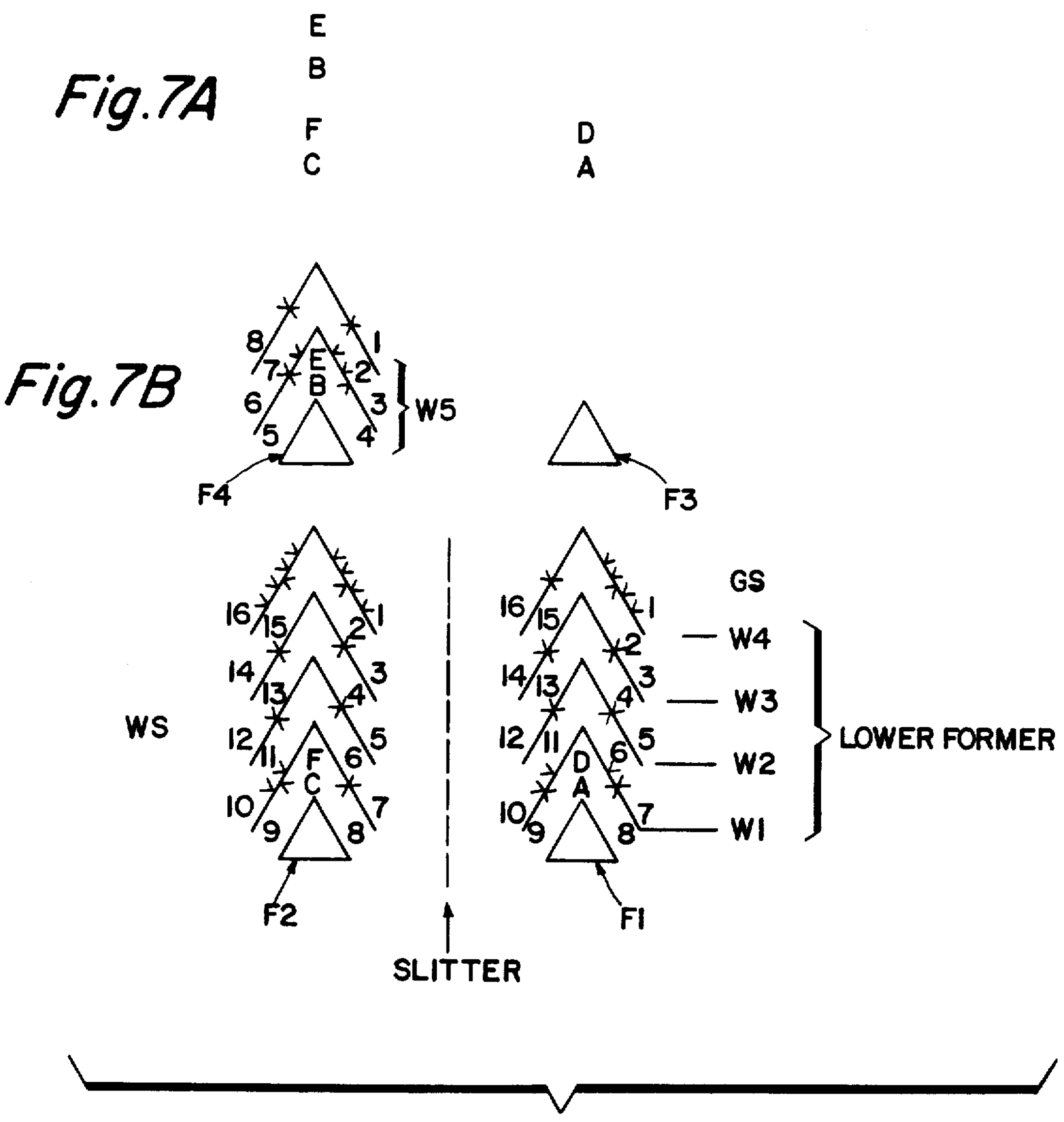
FIGS. 7A and 7B are schematic illustrations showing locations of formers and press webbing arrangements on the formers.

In order to facilitate an understanding of the new job routine, the presentation now given is with respect to a specific example of a product. The example will be for a newspaper having six sections (as will be noted from the program description in Appexdix A this will mean that the run mode must be COLLECT and that sections A and D are paired together, B and E are paired together, and C and F are paired together). The example further assumes that sections A and D will each have 16 pages and that sections B and E will each have 8 pages and that sections C and F will each have 16 pages. Moreover, the example will also assume that the job requires four colors to be printed on section A page 1, section D page 1, and on section C, pages 1 and 16. The example further assumes that in addition to black ink, red ink will be printed on section A, pages 7 and 10 and on section D, pages 7 and 10 and on section F, page 10. The example also assumes that in addition to black ink, blue ink will be printed on section B, pages 3 and 6 and on section E, pages 3 and 6. The arrangement of the webs on the formers will appear as schmatically shown in FIGS. 7*a* and 7*b*. The web configuration shown in FIG. 7*a* is a shorthand method of describing the web arrangement of FIG. 7*b*, as the webs are arranged on the upper formers F3 and F4 and the lower formers F1 and F2. Since there are six sections, the webbing that will eventually take place will correspond with that illustrated in FIGS. 7*a* and 7*b* and this is in conformity with the discussion presented hereinafter in appendix A section 1011 (see six section collect (single delivery)). Of course, at this stage in the procedure the operator does not yet know that the selected webbing arrangement will conform to that as shown in FIGS. 7*a* and 7*b* and this is given at this stage only to facilitate an understanding of the invention. The interactive activity between the operator and the remote entry console in order to enter a new job is described in detail in Table IV which is produced below.

TABLE IV

| New Job Routine | |
|---|---|
| Key | Result |
| 1. NEW JOB | (New Job product description form displayed) # SECTIONS = ? (in CRT area A) |
| 2. 5 (number) | # SECTIONS = 5 (operator knows he made an error) |
| 3. DELETE | # SECTIONS = ? |
| 4. 6 (example) | # SECTIONS = 6 |
| 5. STORE | # SECTIONS = 6 (moves up to |

TABLE IV-continued

| Key | New Job Routine Result |
|---|---|
| | CRT |
| (operator accepts) | area C and added by default is) RUN MODE = COLLECT (in CRT-C) (In CRT-A comes) # PAGES IN A,D=? |
| 6. 16 (example) | # PAGES IN A,D = 16 (in CRT-A) |
| 7. STORE | # PAGES A,D = 16 (is accepted and moves into CRT-c) (and come back with) # PAGES IN B,E=? (in CRT-A) |
| 8. 8 (example) | # PAGES IN B,E = 8 (in CRT-A) |
| 9. STORE | B, E = 8 (appears in CRT-C after display in 7 above) (and comes back with # PAGES IN C, F = ? (in CRT-A) |
| 10. 16 (example) | ? (replaced with) 16 |
| 11. STORE | C,F = 16 (appears in CRT-C after 9 above) (and comes back with) ANY COLOR? (in CRT-A) |
| 12. YES (example product has color) | ANY 4-C PROCESS? (in CRT-A) |
| 13. YES (has 4C) | 4-C IN A,D =? |
| 14. 1 | (? replaced by) 1 |
| 15. NEXT FIELD | B,E = ? (appears after 14 above) |
| 16. NEXT FIELD | C,F = ? (replaced B, E =? since no 4-C pages desired in B,E) |
| 17. 1 | (? replaced by) 1 |
| 18. NEXT PAGE | , (added) |
| 19. 16 | 16 (added) |
| 20. STORE | 4-C PROCESS PGS A,D1 C,F1,16 (appears in CRT-C) (responds back with) ANY SPOT COLOR? |
| 21. YES (product has spot color) | ANY RED PAGES? (in CRT-A) |
| 22. YES | RED PAGES IN A,D=? (") |
| 23. 7 | ? (replaced by) 7 |
| 24. NEXT PAGE | , (comma added) |
| 25. 10 | 10 (added) |
| 26. NEXT FIELD | B,E =? (added) |
| 27. NEXT FIELD | B,E =? (replaced by) C,F =? (no red in B,E) |
| 28. 10 | ? (replaced by) 10 |
| 29. STORE | RED PGS A,D 7, 10 C,F 10 (appears in CRT-C) (come back with) ANY BLUE PAGES? |
| 30. YES (product has blue color) | BLUE PAGES IN A,D =? (in CRT-A) |
| 31. NEXT FIELD | A,D =? (replaced by) B,E =? (no blue in A,D) |
| 32. 3 | ? (replaced by) 3 |
| 33. NEXT PAGE | ,(comma added) |
| 34. 6 | 6 (added) |
| 35. STORE | BLUE PGS B,E, 3, 6 (appears in CRT-C) (comes back with) ANY YELLOW PAGES? |
| 36. NO (product/no spot yellow) | ANY SPECIAL COLORS? |
| 37. NO (no specials) | PUSH IMPOSE IF DESIRED |
| 38. IMPOSE | (System accepts operator input check for errors and if ok then imposes product and generates Web Path Display in CRT area B) (and comes back with) STORE PRODUCT? |
| 39. YES | operator accepts web path display and saves product for future/coming run |

Figure 4:
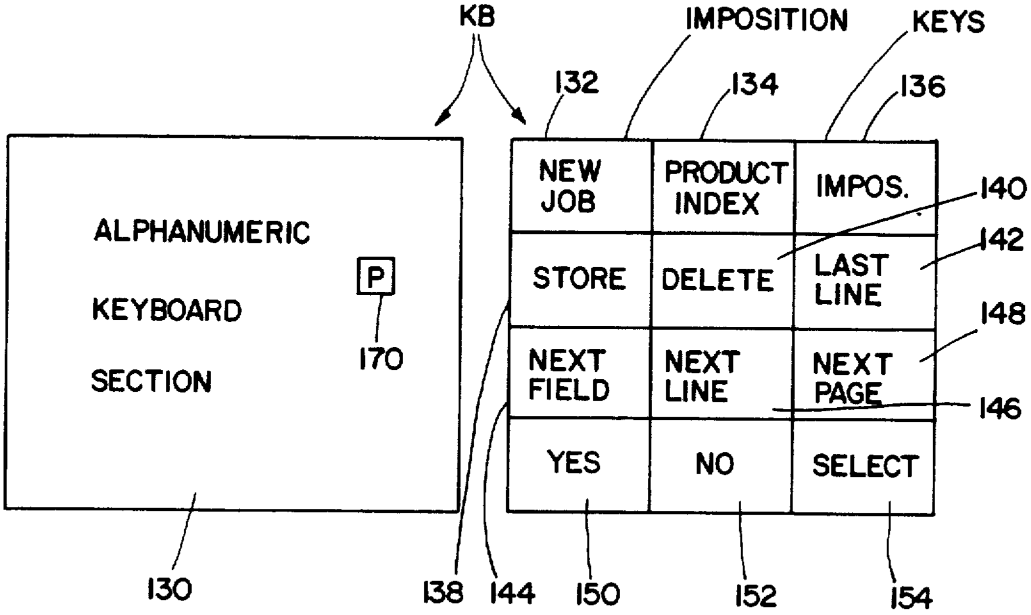
FIG. 4 is a schematic illustration of the keyboard used in the remote entry console of FIG. 3.

Table IV should be read in light of the video display shown in FIG. 5 and the keyboard of FIG. 4. The example being presented by Table IV is given with reference to FIGS. 7*a* and 7*b*.

To assist in understanding the operation brought out in Table IV the following discussion is presented. As can be seen from step 1 in Table IV a new job routine is commenced by the operator actuating the NEW JOB key 132 (see FIG. 4). This causes transmission of a coded signal to the processor which responds by causing a video display to appear on the face of the CRT screen 160 in the interactive display area 160*a*. The display will appear as #SECTIONS=?. In using Table IV it will be noted that the exact display is illustrated and comments with respect to the display are presented in parenthesis. In continuing with the example, it will be noted that in step 2 the operator has answered the question regarding the number of sections by striking the alphanumeric key for numeral 5 on the alphanumeric keyboard section 130. This will cause a display in the display area 160*a* of #SECTIONS=5. The operator knows he has made an error because, in the example being explained, the number of sections is supposed to be 6. The operator's error may now be deleted by his momentarily actuating the DELETE key 140. This will cause the display in the display area 168 to revert to the original question #SECTIONS=?.

Continuing now and referring to step 4, the operator now actuates the alphnumeric key for the number 6 (which is correct for the example being discussed). This causes the display to appear as #SECTIONS=6. The display is now correct and if the operator accepts this as the data he wants entered he will now momentarily actuate the STORE key 138. This is illustrated in step 5 of Table IV. In response to actuation of the STORE key 138 the computer causes the display #SECTIONS=6 to now be displayed in area 160*c* of the CRT screen. Additionally, another legend RUN MODE=COLLECT is also displayed in area 160*c*. This is because the computer knows (see (appendix A at statement 1000) that for a job involving 6 sections the RUM MODE must be COLLECT. If the number of sections inputted by the operator is less than 6, then the computer would have caused a display in the interactive display area 160*a* of the question RUN MODE—COLLECT?. The operator's response would have been either YES by actuating key 150 or NO by actuating key 152. If the answer was NO, then the computer would have known that the run mode would have been in the STRAIGHT MODE and this would have caused a display in the section 160*c* of RUN MODE=STRAIGHT.

Since the run mode question has been properly handled the computer now moves forward in its question-answer program and causes the display of the next question. The next question will be #PAGES IN A, D=?. The reason why the question relates to the pages in sections A and D as opposed to sections A and B, for example, is that the computer knows that in the COLLECT mode of operation, sections A and D for a six section paper will be related sections and will both be directed to the same former (in this case both will be directed to the lower former F1). In response to the question relating to the number of pages in sections A and D, the operator will now respond by keying in the number 16 by way of the alphanumeric keyboard section 130. As in the case of step 4, this will cause a display in section 160*a* of #PAGES IN A, D=16. As in steps 4, 5 the operator will now, in step 7, momentarily actuate the STORE key 138 causing the display to be moved into area 160*c*. Since the next question relates to the number of pages in sections B and E, the legend representative of this question is now displayed in section 160*a* as is indicated in step 5 of Table IV. This continues through step 11 with the operator properly answering the questions dealing with the number of pages in sections C and F.

The next question asked by the computer is ANY COLOR?. This is displayed in the interactive display area 160*a* and an affirmative answer is given by the operator by momentarily actuating the YES key 150. The question now presented in the interactive display area 160*a* will be ANY 4-C process?. This question is really asking whether any 4 color processes are involved. As indicated in step 13 the operator correctly responds by momentarily actuating the YES key 150 because, in the example being given, 4 colors are to be on sections A and D, page 1 and on section C, pages 1 and 16. In response to this affirmative answer the computer now causes the display 4-C IN A, D=?. The computer is there asking whether the 4 colors are in sections A and D and what pages. The operator affirmatively answers the question by striking the alphanumeric key for the numeral 1 the 4 colors are to be used on page 1 of sections A and D. At this stage, the computer does not know if 4 colors are to be on additional pages in sections C and D and is waiting for further alphanumeric entries of page numbers. Since there are no further pages in sections A and D that require 4 colors, the operator now knows that he should ask for the next question. He does this by momentarily actuating the NEXT FIELD key 144. The computer responds by causing a display in the interactive display area 160*a* of the question B, E=?. Since there are not 4 colors to be used in sections B and E, the operator now calls for the next question by again momentarily actuating the NEXT FIELD key 144. This is shown at step 16 in Table IV.

In response to the second momentary actuation of the NEXT FIELD key the computer now causes the next question to be presented. This is C, F=?. The operator will now enter the numerical character 1 since four colors are to be printed on sections C and F at page 1. Since the operator knows that four colors are also to be printed on page 16, he momentarily actuates the NEXT PAGE key 148. This causes a comma (,) to appear after C1, the operator now keys in numeral 16 by virtue of the alphanumeric keyboard section 130 and this numeral is added to the display to obtain C1, 16. Since the operator has accepted the display he now momentarily actuates the STORE key and the legend will be displayed in area 160*c* of the CRT screen with the legend corresponding with 4-C PROCESS PGS A, D1 C, F1, 16 (even though section F will not have four colors on pages 1 and 16 this will be permitted and the display so indicates).

At this point, attention is now directed to the illustration of the new product video display shown in FIG. 6. At this stage of inputting data, the legends shown in the upper portion of the drawing appear on the display screen with the exception of the data representing the red pages and blue pages and with the exception of the graphical depiction of the press and its web layout pattern. The operation continues since additional questions are to be asked of the operator. Returning now to step 20 after the store key has been momentarily actuated, the next question presented on the interactive display area 160*a* is ANY SPOT COLOR? The answer is affirmative because the product to be printed does have spot color in terms of red ink and blue ink. The example is that red ink is to appear on section A and D, pages 7 and 10 and in section F, page 10 and that blue ink is to appear in sections B and E on pages 3 and 6. Consequently, the operator gives an affirmative answer to the question by momentarily actuating the YES key 150. The computer does not know whether there are to be any red pages or yellow pages or blue pages and consequently asks the first question, which is: ANY RED PAGES?. This appears in the display area 160*a*. The answer is affirmative and when this is keyed in the computer causes the display of: RED PAGES IN A, D=?. Since this is correct for the example being given, the operator will now enter the alphanumeric character for the numeral 7 since pages 7 of sections A and D are to be printed with red ink. This numeral 7 replaces the question mark in the display. Since page 10 is also to have red ink in section A and D, the operator will now momentarily actuate the NEXT PAGE key 148. This causes a comma (,) to be added immediately after the numeral 7 in the display in 160*a*. The operator will key in the numeral 10, and this is added to the display.

Since the operator is ready for the next question, he will momentarily actuate the NEXT FIELD key 144 and the computer will cause the next question to be displayed asking whether red is to be in sections B and E. Since this is not the case, the operator will again momentarily actuate the next field key 144 and the question B, E=? is replaced by the question C, F=?. Since the answer is PAGE 10, the operator will now enter the character 10 with the alphanumeric keyboard. The question mark will be replaced by the alphanumeric character 10. Since the operator now accepts the information shown in the display area 160*a* with respect to the questions relating to red ink he will now momentarily actuate the STORE key 138. This causes storage of the information and the display in section 160*a* of the legend RED PGS A, D 7, 10 C, F 10. This causes the next question to appear in display area 160*a* and the next question is ANY BLUE PAGES?. This is shown in Table IV at step 29. Since the answer is YES, the operator will momentarily actuate the YES key 150 and the operation continues steps 31 through 35 in the same manner discussed with respect to the red page questions.

After the information regarding blue pages has been entered, a question will relate to yellow pages with the legend ANY YELLOW PAGES?. This is displayed in area 160*a*. Since the answer is NO, the operator momentarily actuates the NO key 152. The computer will now cause the next question to be asked and this is ANY SPECIAL COLORS?. In the example being given, the answer is NO and the operator will momentarily actuate the NO key 152. This completes the operator input, and the computer will now cause the last question to be displayed. This is PUSH IMPOSE IF DESIRED. On the basis that the operator wants the web layout instructions and product details for this job he will then momentarily actuat the IMPOSE key 136. The computer responds by performing the IMPOSE product operations and when finished it will generate a graphical display in area 160*b* of the CRT screen 160. For the example being described herein, the CRT graphical display will appear as shown in FIG. 6. Additionally, the question STORE PRODUCT? is displayed in the interactive display area 160*a*. If the operator accepts the web path display, he momentarily actuates the YES key 150 to cause this web layout together with an accompanying product detail description to be stored in memory. As in the discussion with respect to the product index routine if the operator wants to see the alphanumeric information relating to the product details associated with the web layout of FIG. 6 he will momentarily actuate the NEXT PAGE key 148. This will cause product details for this job to be displayed. In the example being given, the product details will correspond with the information provided below in Table V.

TABLE V

| | | PRODUCT DETAILS | | | | | | | | | |
|---|---|---|---|---|---|---|---|---|---|---|---|
| | | PLATE POSITION | | | | | PLATE POSITION | | | | |
| UNIT | GS | UA | LA | LB | UB | WS | UC | LC | LD | UD | WEB |
| 2 | A,D | 3 | 4 | 13 | 14 | C,F | 3 | 4 | 13 | 14 | 3 |
| 3 | A,D | 5 | 6 | 11 | 12 | C,F | 5 | 6 | 11 | 12 | 2 |
| 4 | A,D | 7 | 8 | 9 | 10 | C,F | 7 | 8 | 9 | 10 | 1 |
| 6 | B,E | 2 | 1 | 8 | 7 | B,E | 4 | 3 | 6 | 5 | 5 |
| 8 | A,D | 1* | 1 | | | C,F | 1* | 1 | 16 | 16* | 4 |
| 9 | A,D | 2 | 1 | 16 | 15 | C,F | 2 | 1 | 16 | 15 | 4 |
| 4X | A,D | | 7* | 10* | | C,F | | | 10* | | 1 |
| 5X | B,E | | | | | B,E | | 3* | 6* | | 5 |
| 8X | A,D | | 1* | | | C,F | | 1* | 16* | | 4 |
| PAGINATION | | | | | | | | | | | |

The operator may obtain printouts corresponding with the new product display of FIG. 6 and the product details of Table V by merely actuating the P key 170 on the alphanumeric keyboard section 130. This will provide a printout of the information then being displayed on the CRT screen. Thus, with the web pattern of FIG. 6 being displayed the operator will obtain a printout by actuating the P key 170 and then will momentarily actuate the NEXT PAGE key 148 to cause a display corresponding with Table V. To obtain a printout of the product details (Table V) he will again momentarily actuate the P key 170.

From the information provided by the new product printout and the product details printout, the pressman will know how to web the press as well as to properly position the various printing plates. In the discussion which follows reference will be made to the information provided by Table V as well as that provided by FIGS. 6, 7*a*, 7*b* and 8. The information provided by the new product printout (corresponding with FIG. 6) is useful by the pressman in webbing the press itself. This will be discussed with reference to FIGS. 6 and 7. From the product details of Table V the pressman will have specific information as to where the various printing plates should be located. This will be discussed in detail hereinafter with particular reference to Table V and FIG. 8.

WEB LAYOUT

From the new product printout (FIG. 6) the pressman knows that to produce this product will require five webs W1, through W5. Also, the configuration contemplates nine press units 1 through 9 with press units 1 and 7 not being used. Also, the press configuration shows that half decks 2X, 4X, 5X, 6X and 8X are associated with press units 2, 4, 5, 6, and 8 respectively. Four printing units 1, 2, 3, and 4 are located to the left of the right hand folder and five printing units 5 through 9 are located to the right of the right hand folder. In webbing this press, the pressman knows from the new product printout (FIG. 6) that webs W1, W2 and W3 are associated respectively with printing units 4, 3 and 2. Similarly, from the new product printout the pressman knows that web W4 is associated with printing units 8 and 9 and that web W5 is associated with printing units 5 and 6. The webs are to be layed out with respect to the presses as shown in FIG. 6 so that they are directed to the folders such that they are received in the order of their significance. That is, on the lower former F1 and F2 the webs starting from the bottom and extending to the top are webs W1, W2, W3 and W4. Since this is six section COLLECT operation only one of the upper formers, former F4 will be used. Web W5 is sent to that former. Before being sent to former F4, web W5 is slit by a slitter 12 (see FIG. 6) so that one half of the web becomes the bottom ribbon and the other half of the web becomes the upper ribbon on folder F4.

Figure 10A:
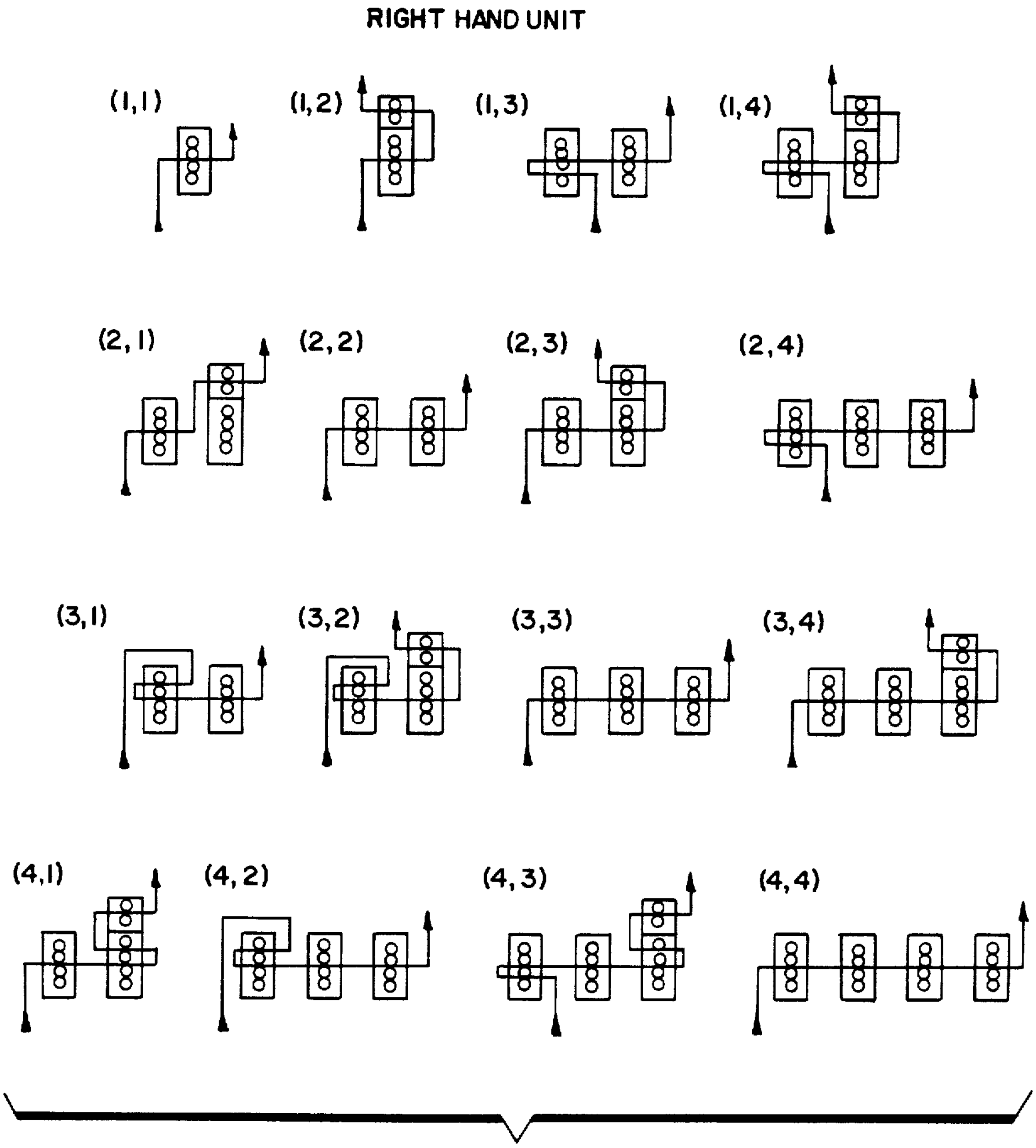
FIGS. 10A and 10B is a chart showing acceptable press unit-webbing arrangements.
Figure 10B:
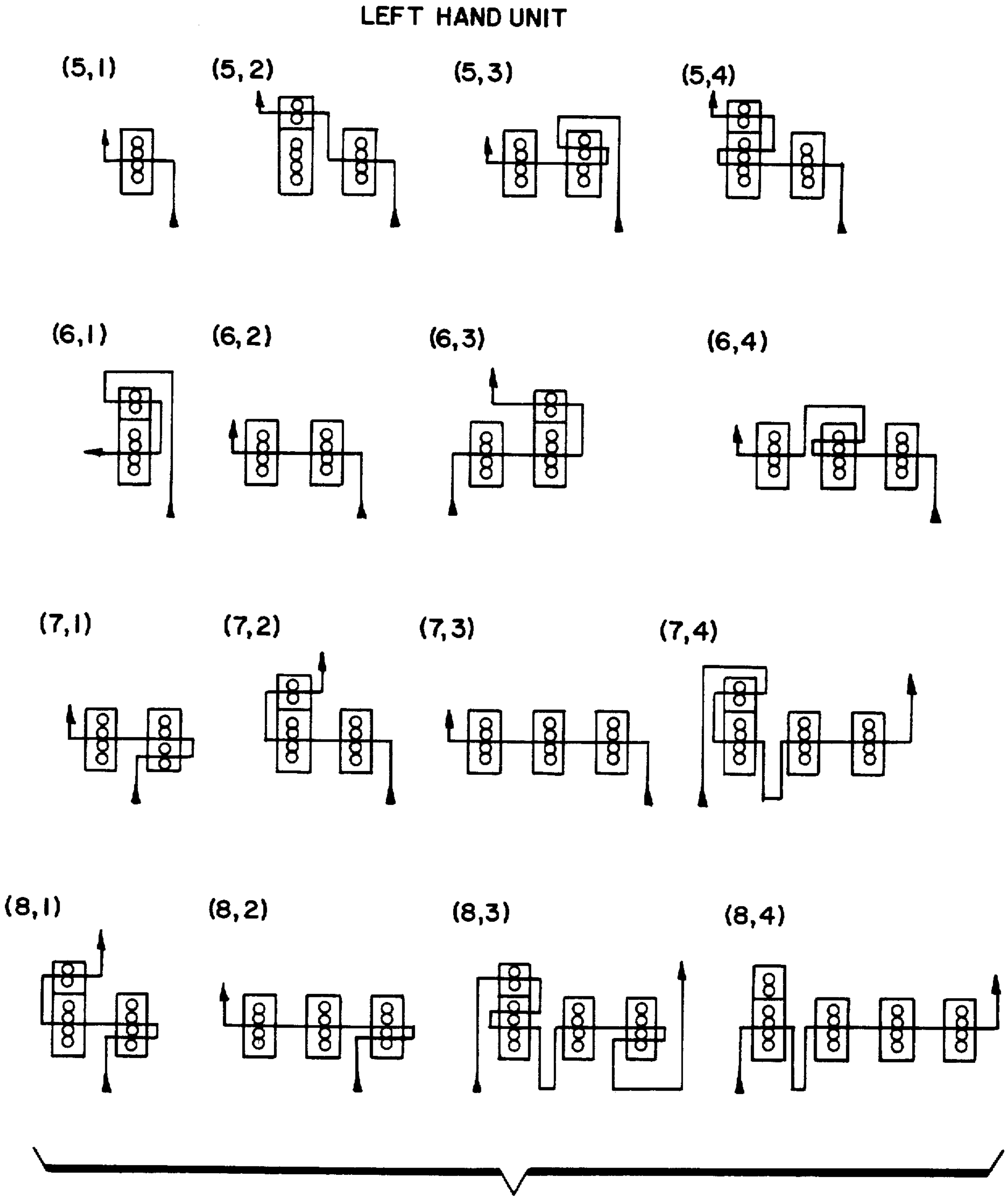

As seen from FIG. 6, the pressman is instructed that the webbing for press unit number 4 requires that web W1 first extend through the lower portion of the press unit in a blanket to blanket configuration and then pass through the upper half deck 4X before being directed, as the lowermost web, to the formers. The illustration with respect to unit 4 thus far indicates to the pressman that two impressions may be made on opposite sides of the web in a simultaneous manner from the blanket to blanket configuration and that the top side (as viewed at the former) will have a second impression made as the web passes through the upper half deck 4X. Similarly, the pressman knows from FIG. 6 that web W2 will be associated with printing unit 3 and will pass through the unit in a blanket to blanket configuration and then be directed as the second web to the formers. Web W3 will be associated with press unit 2 and will be passed through the lower portion of the press unit in a blanket to blanket configuration and be directed as the third web to the formers. At this point, reference is made to the appendix and particularly the discussion given with reference to FIGS. 10*a* and 10*b*. From that discussion it will be seen that valid web wrappings for the right hand units (those located to the left of the former) are shown in FIG. 10*a* and that those for the left hand units are shown in FIG. 10*b*. The web wrappings just discussed above are all for right hand units and each web wrapping is depicted in FIG. 10*a*. The left hand units to be discussed below are all depicted in FIG. 10*b*.

The pressman also knows from FIG. 6 that web W4 is to be associated with press units 8 and 9 with the web first extending through press unit 9 in a blanket to blanket configuration and then extending between the blanket cylinders of unit 9 and brought back between the upper blanket cylinder and the upper plate cylinder and then extends upwards and through the upper half deck 8X between the impression cylinder and the plate cylinder before being directed to the formers. This is a valid web wrap layout as is seen from examination of FIG. 10*b* (note the upper right hand corner). The pressman also knows that web W5 is associated with printing units 5 and 6 and is first webbed through the lower portion of printing unit 6 in a blanket to blanket configuration and then through the upper half deck 5X of press unit 5 (between the impression cylinder and the plate cylinder) and then directed to the formers. After web W5 leaves half deck 5X it is slit to form two half webs or ribbons as they are directed to the upper former F4.

As the lower webs W1 through W4 are directed to the lower formers they pass a slitter (schematically illustrated in FIG. 7*b*) so that each web is divided into half web ribbons before the ribbons are directed to the lower formers F1 and F2. In the same process and in a conventional manner these half webs or ribbons are folded so they appear as shown in FIG. 7*b*.

PLATE POSITIONING

In addition to knowing how to web the press, the pressman or operator must properly position the correct page printing plates on the proper plate cylinders. This information is provided to the pressman from a close examination of the product details set forth in Table V.

From Table V it will be noted that there are no details provided for press units 1 and 7 because, as has been seen with reference to FIG. 6, those press units are not used to produce the example product. The legends at the top of the table will now be explained. Obviously UNIT refers to the press unit. GS refers to gear side of the press. For example, with reference to FIG. 7, the gear side GS is shown on the right side of the figure and the work side WS is shown on the left. It is conventional in the art to refer to one side of the press as the gear side and the other as the work side. The legend WS refers to the work side. Relative to the gear side, the plate position information refers to the A position or the B position with reference to the upper cylinder (U) or the lower cylinder (L). Thus UA refers to the upper plate cylinder at plate position A whereas LA refers to the lower plate cylinder at plate position A. The numbers which are indicated below these captions refer to the pages that are to be printed at those plate positions. To the right side of Table V the information refers to the plate positions on the work side of the various plate cylinders. Thus UC refers to upper cylinder, plate position C, whereas LC refers to lower cylinder, plate position C and so forth. At the far right of Table V is the WEB designation. The numbers below that designation refer to the web number (see FIG. 6).

With the foregoing explanation of Table V in mind, the pressman will now utilize the product details. The first line of details refers to the plate positioning for press unit 2. Because the run mode has been designated as COLLECT, the computer has caused a printout indicating that newspaper sections A and D are related sections and each has the same number of pages (in this case 16). Sections B and E are also related and each has 8 pages. Sections C and F are also related and each has 16 pages. Returning now to Table V, the pressman knows that respect to press unit 2, related sections A and D have their various pages printed at the same plate positions. In the art the term COLLECT refers to the fact that the same numbered pages in related sections are printed at the same plate position. A typical plate cylinder carries two page plates wrapped around its periphery. In the STRAIGHT mode of operation, both page plates may be for the same page of the same section, resulting in doubling of the newspaper production. In the COLLECT mode, one of the page plates will be for a page of one section and the other page plate will be for the same numbered page of the related section. Thus for example, section A, page 3, will have its page plate in press unit 2 at plate position UA. Section D, page 3, will also be printed at press unit 2 at plate position UA. In each case, then the higher numbered section, such as section A, may be considered as having its page plate on the first half of the periphery and the lower numbered section such as section D, will have its page plate on the second half of the plate cylinder periphery.

Figure 8:
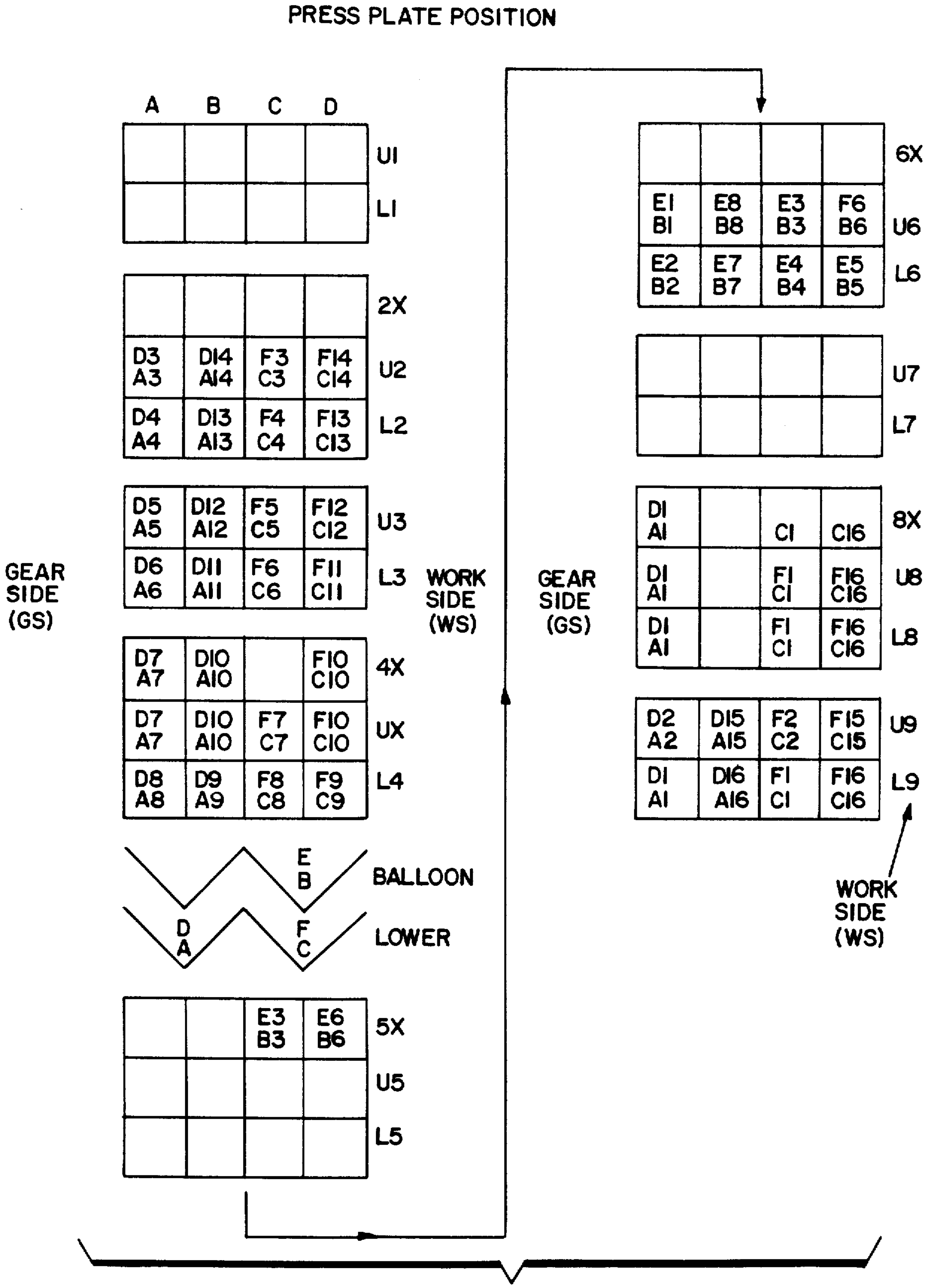
FIG. 8 is a schematic illustration showing the positioning of page plates on the plate cylinders of a 9 unit printing press.
Figures 9A, 9B:
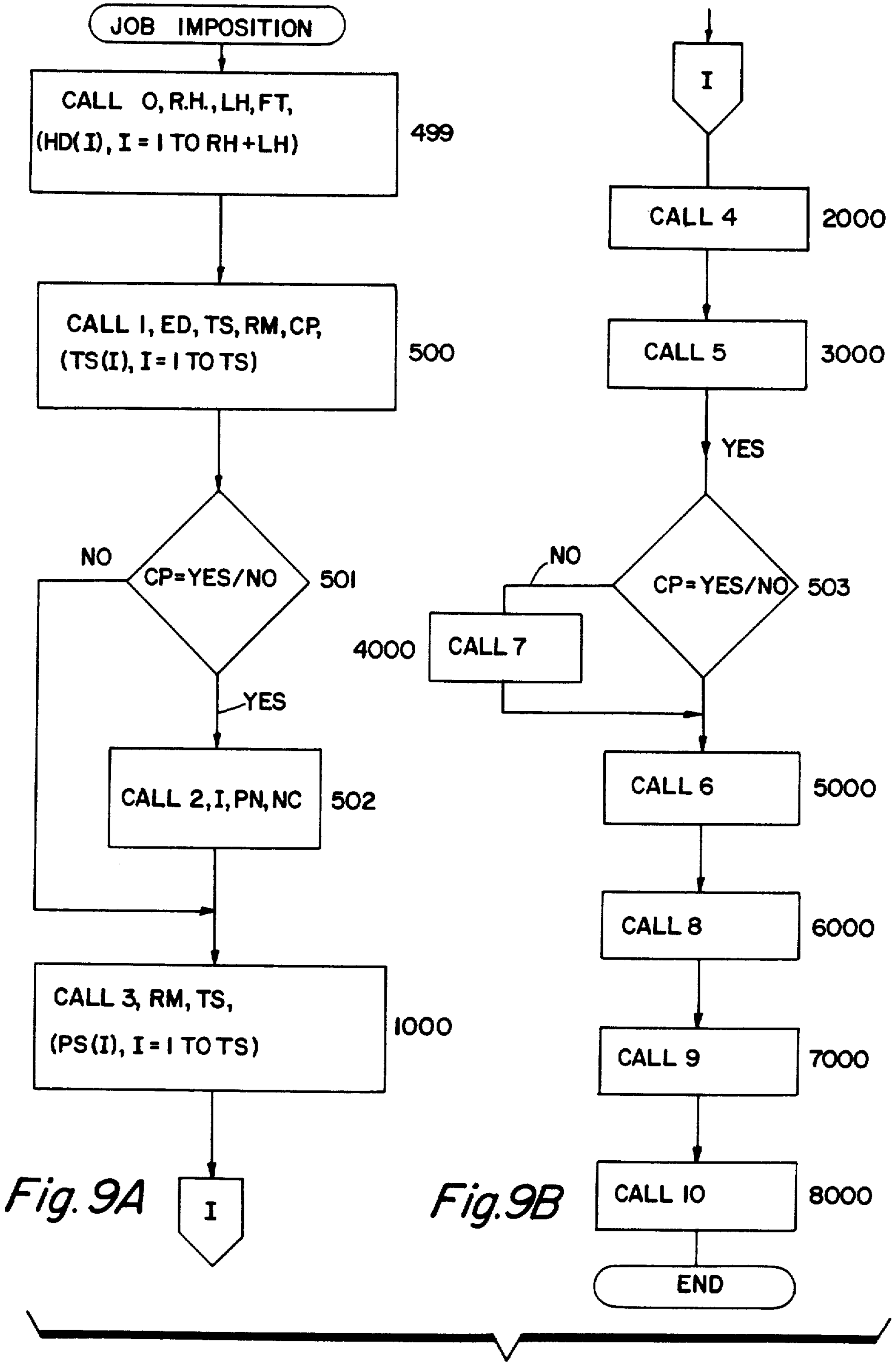
FIG. 9 is a flow diagram showing the operative states of a computer program.

The pressman in using the product details of Table V may obtain a press plate position configuration as depicted in FIG. 8. This figure should be studied in light of Table V and FIGS. 6 and 7. The rectangular boxes represent press units 1 through 9 of the examples shwon in FIG. 6. The first rectangular box (shown in the upper lefthand corner of FIG. 8) is provided with four upper squares designated as U1 and four lower squares designated L1. U1 refers to the upper plate cylinder on printing unit 1 and L1 refers to the lower plate cylinder of press unit 1. Immediately above the boxes in FIG. 8 there is a designation A or B or C or D. These refer to the press plate positions going across the cylinder. Thus, it is recognized that press plate positions A and B are considered as being on the gear side of the press whereas press plate positions C and D are on the work side of the press. Since press unit 1 is not being used in the example given, there are no page plates located on the upper plate cylinder U1 or the lower plate cylinder L1.

Again referring to FIG. 8, the next rectangular box refers to the press plate positions for press unit 2. As noted from FIG. 6 and Table V the upper half deck 2X is not used. Consequently, no page plates are shown on the plate positions of the upper half deck 2X. The upper plate cylinder U2 and the lower plate cylinder L2 will carry page plates for producing the example product. It will be noted from FIG. 8 that upper cylinder U2 at press plate position A will carry the page plates for printing section A, page 3 and section D page 3. Similarly, the upper cylinders will also carry at plate position B the page plates for printing section A, page 14 and section D, page 14. Likewise at plate position C the upper cylinder carries the page plates for section C, page 3 and section F, page 3. Also, at plate position B, the upper cylinder carries the page plates for printing section C, page 14 and section F, page 14. The lower cylinder L2 in press unit 2 carries the page plates for printing sections A and D, page 4, sections A and D, page 13, sections C and F, page 4, and sections C and F, page 13 all in the press plate positions as shown in FIG. 8. The remainder of FIG. 8 then should now be self-explanatory in light of the example discussions presented above.

As will be recalled from the discussion dealing with inputting data to the remote entry console, the product desired required a four color process on sections A and D, page 1, and sections C and F, pages 1 and 16. The information provided from the new product printout (FIG. 6) tells the pressman which press cylinders are to be dedicated to these various colors. Using the example of four colors on section A, page 1, it will be noted that this is accomplished with press units 8 and 9 on web W4. As the web passes through the press unit 9 in a blanket to blanket configuration it will receive two simultaneous impressions on opposite sides of the web. On the lower side (as seen in FIG. 6) the impression will be that from the page plate at plate position A on the cylinder U9 so as to print in one color (black) section A, page 2. On the upper side of the web (as viewed in FIG. 6), the impression will be that from the cylinder L9 at plate position A so as to print in black ink page A2. The web then is passed to press unit 8. The designations L and U on the work side only of FIG. 8 refer to upper and lower cylinders, respectively. The web will initially pass through a blanket to blanket configuration and receive a first colored ink from the lower plate cylinder and then it is wrapped back through a direct impression between the upper plate cylinder and the upper blanket cylinder where it receives a second colored ink. Thereafter the web is passed through the upper half deck 8X where it receives on only one side a third colored ink so that together with the black ink from press unit 9 the web now has four colors on one side and one color (black ink) on the other side.

Four colors are also to be printed on sections C and F pages 1 and 16. As will be seen from the product details, pages 1 and 16 of sections C and F are printed on web W4 of printing units 8 and 9. This table also shows that page 1 is printed by direct lithography in the upper plate cylinder at plate position A (the asterisk indicates direct lithography). The analysis given above with respect to sections A and D, page 1, follows for the positioning of the page plates for sections C and F, pages 1 and 16 and this is shown by the chart in FIG. 8.

In a similar manner, the pressman is shown by the product details of Table V that in positioning the printing plates red ink (in addition to black) is applied at sections A and D, pages 7 and 10. Pages 7 and 10 of sections A and D are printed on web W1 using press unit 4. Since color is added the pressman knows that this can be done by using the half deck 4X in direct lithography. Based on the product details of Table V the plate positioning is as indicated in the chart of FIG. 8. Similarly, red pages are required for sections C and F, page 10 and this is accomplished upon web W1 using press unit 4 together with the half deck 4X. The plates are positioned as indicated by the product details of Table V. In a similar manner, blue pages are provided at sections B and E at pages 3 and 6. From the product details it is seen that this is accomplished using web W5 with press unit 6 together with half deck 5X. The printing plates are positioned in accordance with the product details so that they occur as shown in FIG. 8.

In FIG. 7B, the various webs are shown schematically as they are fed to the formers F1, F2 and F4. The various sections of the newspaper A through E are indicated. It is to be noted in the COLLECT mode of operation each former, such as former F1, carries in succession two different sections, such as sections A and D. Each section will in cross section, appear as shown in FIG. 7B. for purposes of simplification, the various pages on each section are indicated. Thus, in the case of section A all 16 pages are numbered. Additionally, the "V" markings on the various pages represent the number of colors employed. Thus for example on the lower former F1 section A, page 1 has four "V" markings whereas section A, page 2 has one marking. This coincides with the product to be produced which requires that four colors appear on section A, page 1 and only one color on section A, page 2.

DISCUSSION

In imposing the job shown in FIG. 6, the operator supplies the information during the interactive mode, as discussed above, that there are six sections. The run mode is collect with sections A and D having 16 pages, B and E having 8 pages, and Ç and F having 16 pages. The process is a 4 color process for pages A(D)1, C(F)1,16. The red pages are A(D)7, 10 and C(F)10. The blue pages are B(E)3, and 6. On entry, the color information is coded into a 6 digit number N(6), as indicated in the appendix. The first four least significant digits of the number indicating a specific color, the first digit position being black, the 5th digit of the number indicating a four color process, and the 6th digit of the number indicating the total number of colors for the page. The entry information is stored in entry location for future reference.

Assuming that the entry routine has been completed, the computer proceeds to the 1000 routine for implementing the 1000 rules of the appendix. In accordance with the rules the sections with the highest numbers of pages are to be located on the lower formers. Accordingly, the programmed routine enters in a mode to determine which of the section or sections entered have the greater number of pages for assignment to the lower formers.

The computer routine starts first by retrieving the section page number from the entry location and checks to see if the total number of pages in section A is larger than in section B. If the answer is yes, the question, is B larger than C is asked. If the answer to this is yes, then the larger sections will have been identified as those pairs of sections involving A and B and these sections will be associated with the lower formers with the section C assigned to the upper formers. Using a look-up table in memory as shown in the 1000 rules at 1011 the combination 6 in the appendix in the 1000 table is read. The table indicates that sections A and D are on the gear side and sections B and E are on the work side respectively of the lower formers and C and F are on the upper formers W.S.

If in proceeding through the last routine, if the computer determined that A was not greater than B and received a no answer then the next routine would be to determine whether A is greater than C. If the answer is no, then the larger sections are B and C and the computer will then check the look up table for C and B being larger. This would be combination 5 in the 1000 table and indicates that B and E are to be on the gear side of the press and C and F are to be on the work side of the press on the lower former with sections A and D on the upper former on the gear side of the press. If the answer is yes, then the answer would indicate that A and C are the larger sections (combination 7) if C is greater than B. Similarly if B is not greater than C in the first routine and a no answer is received, it is now known that A is greater than B and that B is not greater than C so that A and C have a greater number of total pages than B and the executive routine again goes to the table to assign the combination of A and C. This is combination 7 in the 1000 table.

In the illustration where sections A and D are 16 pages and sections C and F are 16 pages while sections B and E are 8 pages, sections B and E are located on former F4 while sections A and D are located on former F1 and sections C and F on former F2. This is combination 7 in the 1000 table.

A scratch pad Table G is established to store by former, the section thereon and the number of pages. In the illustrative example, the table will be as follows:

TABLE G

| Former | Sections | # Pages |
|---|---|---|
| F1 | A,D | 16 |
| F2 | C,F | 16 |

TABLE G-continued

| Former | Sections | # Pages |
|---|---|---|
| F3 | — | — |
| F4 | B,E | 8 |

After the former routine has been executed, the program proceeds to the 2000 routine for implementing the 2000 rules for indentifying the size of each web in each former section. The routine first checks the number of pages in the upper formers by checking the table G to determine the sections on the upper formers and the number of pages. The routine determines for the illustrative job, that former F3 has no pages and that former F4 has 8 pages then subtracts to obtain the difference to determine whether to proceed with a 2001 routine or a 2002 or 2003 routine. Since there is a difference in the illustrative job, it will then check to see if that difference is greater than 2.

In the illustrative job, it is greater than 2 and the routine will jump to the program routine set forth in accordance with rules 2003. The first step in this routine is to divide the number of pages in each section by 4. The routine retrieves the number of pages from the entry information in Table G, divides the section by 4 and determines that both remainders are 0.0. Accordingly, it is now known that no ¾ webs are required.

The next operation is to subtract the quotients of the immediately preceeding operation and this number will indicate the number of half webs required. In the illustrative job, the quotients will be 2 and 0 and the computer will have determined that the number of half webs are 2. Having determined that the number of half webs are 2, the routine will enter in the scratch pad memory for that two ½ webs are required and the sign of the subtraction. The sign of the subtraction indicates to the computer that the half webs are entered on former 4 and the computer will enter separately the code for a half web in two successive positions in memory. The code will indicate whether the ½ web is centered on former 3 or former 4 or on the press centerline if that were the case.

The routine then proceeds to determine the number of full webs required. To do this, the routine checks the scratch pad memory for each web position and counts six for each ¾ web, four for each half web and two for each quarter web to determine the number of pages provided by the one quarter, one half or three quarter webs and then subtracts this sum from the sum of total pages on formers 3 and 4. In the illustrated embodiment, 8 pages are on former 4 and 0 pages on former 3 and in the routine described just prior to subtraction, 8 pages would have been computed for the two half webs. The difference is therefore 0, indicating that there are no full webs. For paging purposes, the computer then enters the size of the webs into a web position table F for each former, in this case former 4. In this case, only half webs are present and the half web codes in scratch pad memory will indicate that they are centered on former 4. Only two half webs are involved. Accordingly, the routine enters half webs in positions 1 and 2 for the upper former 4 together with a code indicating they are centered on former 4.

The routine then proceeds to the lower formers and as above first determines the difference in the number of pages in the section on formers 1 and 2. In the illustrated job, the pages in the sections are equal and the computer goes to the 2001 routine for operating in accordance with those rules to first divide the number of pages in the formers 1 and 2 by 4. This operation determines that the quotients have remainder of 0.0 and this indicates that all webs are full webs. Since this determines the size of all webs, the routine immediately enters into the web position Table H full web codes in four successive web positions, positions 1 to 4, for formers 1 and 2.

For purposes of illustratiön, an illustrative example, it will be given for the situation in which the number of pages on the lower formers are different and 10 pages will be assumed for former number 1 and 16 pages for former number 2. On the subtraction of the number of pages in the section the routine will again check to see if the difference is greater than 2 and in so determining will jump to the routine implementing the 2003 rules. The number of pages in each different section is divided by 4 producing the quotient 2.5 for the section on former 1 and 4.0 for the quotient for former 2. In accordance with the rules this indicates that one three quarter web is required and the computer will enter in the scratch pad memory one three quarter web. Then the computer will subtract the two values obtained from each other and take the absolute value which will be 1.5 and subtract 0.5 from this number. This result, 1, is equal to the number of ½ webs required. After determining the three quarter and one half webs required the computer then determines the full webs by adding four for each one half web determined and 6 for each three quarter web to reach a sum of 10 and subtracts that from the total pages (26) in the sections on the two formers to obtain the difference of 16 which is then divided by 8 to ascertain the number of full webs which in this instance will be 2 and the computer will then enter 2 full webs into the scratch pad table. After computing this, the computer will then transfer the webs to the web position tables by former in accordance with the rules as provided in section **2003*a*(2). As set forth, the computer checks to see the number of half webs required and positions these in the bottom most web positions, i,e., web positions 1 in table H for the lower formers and upward for each one half web required and will enter the one half code in accordance with the rule which indicates that it is centered on the former with the most pages, in this case which is former 2. In accordance with the rules, the computer will then search for the three quarter web and will enter a three quarter code in the next web position in table H for formers 1 and 2 with the indication that it is centered on the same side as the one half webs by entering the three quarter web code with a digit indicating that it is centered on former 2. The computer will then proceed to put full web codes in the web positions 3, 4, in the respective positions for former 1 and 2 indicating that full webs are in these positions. The web position Table H for this example would have stored in it at this point, the following for formers 1 and 2**.

TABLE H

| | Former 1 | | | Former 2 | | |
|---|---|---|---|---|---|---|
| Web Position | Web Size | W.S. | G.S. | Web Size | W.S. | G.S. |
| 1 | ½(1) | | | ½(1) | | |
| 2 | ¾(1) | | | ¾(1) | | |
| 3 | 1 | | | 1 | | |
| 4 | | | | 1 | | |
| | | | | 7, 10 (color codes) for page | | |

The foregoing illustrative example is different from the job of FIG. 6 and will indicate the manner in which the web position tables are generated in accordance with the 2000 rules.

The computer routine now proceeds to the 3000 routine for implementing the rules for assigning the page numbers to the webs. In doing this, the routine proceeds former by former and first determines from the entry information the number of pages in the section in the formers and then beginning with the highest number storage location in the former table assigned a web to it starts and determines the highest number, assigning pages, to the webs in sequence. For each half web centered on a former, four pages are assigned. For each half web centered in the other folder two pages are assigned. In certain situations, certain former positions in a former will be devoid of a web (see example above) and if so the routine will proceed to the next web position without assigning pages. The lower formers for the illustrative job, (FIG. 7A) will be first considered, it being understood that the routine will then proceed with the upper formers. In checking the former 1, it will be determined that web position 4 has a full web and the computer will assign pages 1 and 16 and enter these in the web position table H. The position of the page numbers in the table shows work side or gear side in the folder.

The same routine will occur for former 2.

In checking former 1, it will be determined that web position 4 of the former has a full web and the computer will assign pages 1 and 16 to the top of the web and pages 2 and 15 to the bottom of the web and enter these in the proper location in the web position table. The location of the number in the table indicates whether the page is on the work side or gear side of the folder. The routine in assigning page numbers as expressed in the rules always assigns the first page and the last page of a section to the top web in the former on the gear side and work side respectively. Then the computer proceeds to assign page numbers on the gear side which increases a unit from the top to the bottom of each succeeding web and decreases a unit on the work side from the page number of the last page from the top to the bottom of the web.

After entering the top and bottom page numbers for the highest number web location, the routine then checks the next web position number in the former and repeats its page assignment routine. In the case of former 1, the operation will be to assign pages 3 and 14 to the top side of the next web position and pages 4 and 13 to the bottom side and will proceed to enter the page numbers in the web position table as the case of the highest web position in the former. The routine will continue and be repeated for former 2. In the illustrated job former 2 has four full webs and the result of the routine will be the same. In addition to entering the page numbers in the web position table for each former, the routine before entering will check the entry information to see if the page has color. For each page entered it will, in a corresponding position in the table, place the proper color code [N(6)]. If no colors are specified for the page, the color code for black will be entered. Black will also be entered for pages specified as having color.

Proceeding to the upper formers where only former 4 has pages thereon, the computer routine will determine that the highest number web position in former 4 is a half web and will assign pages 1 and 8 to the top of the web since it is an eight page section and will be the top of the web in the former and pages 2 and 7 to the bottom of the web and enter these page assignments in the web position table as in the case of lower formers. However, when a half web is detected the routine will remember that a half web has been detected and if a half web is detected in the next position of the former, this half web will be flagged in addition to the computer assigning pages 3 and 6 to the top of the web and pages 4 and 5 to the bottom of the web in entering these in the web position table. The web routine has now completed its paging routine and is ready to determine the number of printing units necessary for each web.

To illustrate the information in Table H, the table for former 4 will be as follows:

| | Former 4 | |
|---|---|---|
| Web Position | Web Size | Flag |
| 1 | ½(4) | 1 |
| 2 | ½(4) | 0 |

After completing the web for paging and according to the pages in the former tables for the various web positions and indicating whether top or bottom of the web, the routine proceeds to determine the number of color units used per web in accordance with the 5000 rules. The computer routine begins examining the web position of both lower formers in the web position table beginning with the lowest number web position which is the bottom web of the formers.

The routine will start with the lower formers when determining the number of color uunits used for webs.

Beginning with the lower formers the routine will first check the color numbers for the pages in the web position table for the top of the web in the first position i.e. web position 1 of the formers 1 and 2. On reading a color code number for a page, the routine will make an entry into storage locations in the storage locations in the scratch pad memory for a web color table. If the first color code read has a 1 in any of the digit spaces indicating a color, it will enter a 1 in the six digit web color number for web 1 top side of web in the proper color position and for each successive page color number read will continue the entry of a 1 for each color specified from the web position table in the proper digit position. After completing the top of the web it will then examine the color digits entered in the number and enter the total number of colors in the number of colors digit position ($N_6$). If during the examination of web pages a four color code ($N_5$) is read for a page color, it will enter digits 1 in each of the color positions and the total number four in the number of colors for the web. Similarly, if on totaling the number of colors a 4 color process is indicated for the web, a 1 will be inserted at digit $N_5$. On completion of the totaling operation, the former numbers will be entered in the web color table. After completing the top of the web in the lowest position first position of the web former, it will then proceed with the bottom of the web in the same manner as the top to develop the colors and number of colors for the bottom of the web. This number will be in scratch pad memory in a location for the colors bottom of web 1.

In the illustrative job, page 1 of Sections A(D) and C(F) are in the first web position for the formers and these have four colors. Consequently, a digit will be entered in digit position $N_5$ and a 4 in ($N_6$). The routine when finding a four color process need not check the pages in former 2 for the top of the web since all four colors are required in any case for the web. The web will then proceed to retrieve the color information for the bottom of the web in web position 1 for formers 1 and 2 and this check will indicate that for the bottom web the page numbers 8 and 9 are black and will enter this color indications in a six number in the web color table for bottom of the web and indicate the total number of colors as 1. A six digit number now indicates that the first web has four colors on top and one color on the bottom. The routine proceeds to examine all web positions in formers 1 nd 2 and develops codes in the above manner for the particular colors in each former with the total number of colors for the formers.

Web Color Table
Illustration - Web 1 Only

| Unit Comb. Web Section | Color Top | Color Bottom | | Formers | Press Units |
|---|---|---|---|---|---|
| 1 A($N_0 \ldots N_1$) | | ($N_6$ .$N_1$) | F1 | F2 | ($1\frac{1}{2}$) |
| 4.4X | | | | | |

After having developed the web table for the lower formers in the scratch pad memory and assigning a web number to the lower formers, the routine then proceeds to examine the upper formers beginning with the lowermost web in the formers. In the upper formers the lowermost web is in former number 4, web position 1 and on retrieving of the color information for this position determines that the web position 1 as flagged indicating that the next former position must be checked as web position. This flag is entered in the web color table to show a split web. The color codes, pages 3 and 6, which are on top of the web have only black thereon and therefore in the web position 5 in the web color table, the color code is entered with total number of one color in the number of colors for the top of the web and a digit 1 entered in the black position. It then examines the pages for the bottom of the web in position 1, pages 4 and 5, and it will be determined that page 4 has a blue color thereon and therefore the digit 1 will be entered in the blue location and the black location in the six digit number for the bottom of the web and upon examination of page 5 it will be determined that it also has a blue so the digit 1 is entered again in the same digit location. Since the web position 1 for the formers 4 was flagged during paging, the routine flags then proceeds to next position 2 and examines the top of the web, i.e., pages 1 and 8, and determines that there is no color except black and enters the code black in the black digit position for top of web. It then completes the routine for the top of the web by determining the number of digit positions in the web color number (top) which have color and entering that into the six digit position of the number as the total colors on the top of the web 5. After completing the routine for the top of the web, it then proceeds to determine the routine for the bottom of the web in position 2 and proceeds to determine the color code for the web bottom and then totals the bottom color and enters that into memory in the 6th digit position.

Accordingly, the table in scratch pad memory now has the webs by web number in the press with the number color units coded for both top and bottom of the web. At the time that the routine retrieved the colors from the former web position table, it also entered a web number for each web position and if a split web.

The program routine then proceeds to determine from the table set forth in appendix 5003, the number of full decks and half deck units required for the top and bottom of each web and stores that in the web color table in scratch pad memory. This is done by reading the number of colors for the top and bottom of the web from the web color table and, addressing the table set forth in appendix 5006 which is stored in the memory to determine the number of units and half decks necessary for printing the top and bottom of the web. It then sums these units to see if more than the total number of pres units are required. Two colors are needed for the top of the web and one for the bottom. After determining that there are sufficient press units to do the job, the computer routine will proceed to routine 5000 for assigning the webs to the press units in accordance with the color required. The routine will first proceed to the web color table at the web 1 position and determine from the color numbers top and bottom, the total colors required top and bottom and after making this determination will address the combination tables shown in appendix X to determine the configuration of the units necessary to print this color unit starting with N, which in this case is unit 4, the unit immediately adjacent the folder on the right hand side. The routine determines from the combination tables that the combination needed is N.NX*. Following this, the routine then proceeds to examine a press configuration table having in storage an N code for a each printing unit and an NX code for each half deck. In accordance with the 5000 rules, the routine will begin checking the right hand units since the folder is a right hand folder and it first checks the configuration for print unit 4 and determines that this configuration is N.NX* and marks print unit 4 as being assigned and enters the N.NX* code into the web table and into a print table as 4.4X*.

As will be explained in more detail hereinafter, the print table includes storage locations for each print unit and each half deck for storing web numbers, the combination numbers for the unit which indicates the web configuration needed for display purposes, and the pages by plate positions for the cylinders of the unit, and the section number of the pages.

After assigning the first web position in the lower formers, the routine then proceeds to determine the highest most web position in the press which is the top web in the upper formers. In the job illustrated, the top web is being web number 5. In checking web number 5 in the web color table it will determine that the colors on top and bottom are one color on top and two on the bottom and referring to the tables for right unit shown in the 6000 rules that units Mx.(M+1) are required. This code indicates that a half deck and a full printing unit with or without a half deck is needed to the right of the unit as viewed in FIG. 6. Checking the press configuration starting with the unit 5, the first of the left hand units the routine determines that unit 5, with a half deck 5X is available and assigns the half deck to web number 5 in the press configuration table and enters 5.5X in the web color table and 5.5x and the web number in the print table. The routine then proceeds to check for a (M+1) unit (M indicating a press unit and +1 indicating to the right of MX, by checking the next possible press unit, press unit number 6. This is available and the routine assigns the printing unit (but not the half deck 6X) to the web on the press configuration table and enters the code 5.5X in the web color table and in the print table for units 5.5X together with the web number.

Following the above routine, the routine will then assign web number 2 to unit 3 a right hand unit and make the necessary entries and then proceed to web number 4. When attempting to assign web W4 which has four colors on top and one color on the bottom of the web, it will be determined that an MX.M*.(M+1) configuration is needed for the left hand units. In checking the press unit 7 in the press configuration table it will determine that this unit cannot be used and will proceed to check unit number 8 which will supply the half deck and full unit needed. When a unit is skipped it is marked on the press configuration table as assigned. It will then determine that unit 9 will provide the additional full unit needed.

The next routine for the computer program is to generate a display table for displaying the configuration on the video screen. In displaying the configuration, the routine first checks the press configuration table and stores in a display memory section a code for the configuration of each unit, i.e. whether it is a press unit having upper and lower plate cylinders or a press unit with a half deck. In display, these codes will first cause the generation of the press layout and then the web configuration will be overlaid.

For the web configuration the computer has stored in display memory the instructions for generating web displays for the various color combinations as shown in 10*a* and 10*b*. The codes for generating these web configurations to overlie the printing units are stored in the memory of the CRT display and can be called forth by instruct codes which are stored in a look up table which is addressable by number of colors for top and bottom of the web, right hand or left hand. In addition the code table has codes for storing the route to the former from each of the printing units. In the case of a printing unit having a half deck, there are three possible routes of the former, i.e. from the left or right side of the half deck or from the printing unit. These codes are unique to each press unit and half deck stored by printing unit and half deck number. Accordingly, in the routine for generating the web display, the routine proceeds to examine the print table beginning with printing unit 1 to determine if there is a web in the printing unit. There is no web in printing unit 1 in the job illustrated and it proceeds to printing unit 2 and determines from the print unit table that web 3 is involved in printing unit 2. It enters web 3 in the display code memory to be printed at the start of the web and checks the web color table and determines that the web is a one-over-one color and therefore assigns the code from the table represented by FIG. 10A for the right hand unit color code (1,1) for generating a one-over-one web configuration. Since only the unit 2 is involved with web 3 it seeks out the code from the printing unit to the former for printing unit 2. It enters that in the display code memory. Proceeding to unit 3 it makes the same determinations as in unit 2 and enters the proper code including the unique code to the former from unit 3. Proceeding to unit 4, it determines that web 1 is in the unit and determines that the web configuration needed is the one color on top and two color on bottom web configuration (2,1 code R.H.) and from the look up table retrieves and assigns this code to the display memory together with web 1 and since only unit 4 is involved it also retrieves and stores the code for the route to the former from unit 4.

Proceeding to the left hand units the routine will determine that web 5 is involved from the print table and checking the web color table it will determine that the unit is a 2,1 color combination (color code 5,2) for left hand units and will seek that web configuration from the printing unit and store it in memory together with the code for going from 5X to the former with a split web.

The first printing unit in the sequence in the print table which is found to have a web in the printing unit is printing unit 2 having web 3 associated therewith. After determining that printing unit 2 has web 3 associated therewith the routine then checks the web color table to determine the color combinations on web 3 and determines that the web has one color top and bottom and proceeds to the web position table to identify the pages to be printed by unit 2. Press unit 2 is in the formers 1 and 2 as determined from the web color table and the routine finds web 1 and first checks the gear side former, i.e. former 1, to determine the pages on top of the web which are to be printed by unit 2. The web position table for former 1 has the pages listed by gear side and work side for web 3. These pages are transferred to the print position table to positions UA and UB together with the section number for the sections assigned to former 1. The routine then checks for the pages numbers on the bottom of the web in former 1, and enters the section and page numbers for the gear side of the former in position LA and LB in the print table for the gear side and work side of the former respectively. The routine then proceeds to the work side former for web 2, i.e., former 2 and first checks the top of the web position table for former 2, web 3 and enters in position UC and UD in the print table for press unit 12 the gear side page number, and the work side page number respectively. It then proceeds to check the bottom of web 3 from the web position table for pages associated with former 2 and enters these in positions LC and LD in the plate position table with the work side position page being entered in position LC and the gear side page being entered in position LD. After making this entry for the pages in former 2, the routine checks the entry information for former 2 for the section number of the pages and enters that in the proper location in the print table.

Similarly, the print table is next checked for unit 3 and it is determined that web 2 is present in printing unit 3 and this is entered in the web position table in the web location and the routine proceeds to check the web color table for the total number of colors and determining that the total number of colors is 1,1 proceeds to the web position table to determine the pages in the same manner as was determined for printing unit 2.

The next printing unit which is checked by the routine is printing unit 4 and it is determined that web 1 is in printing unit 4 and this web is entered into the web position location in the print table and the routine proceeds to the web color table for web position 4 to determine the number of colors in web position 4 and determines that there are two colors top and one color bottom. In determining that there is more than 1 color, top and bottom, and that there are more colors on one side of the web than the other the routine then proceeds to determine whether there is a common color from the color codes stored in the web color table for top and bottom and determines that black is a common color. In determining that black is the common color, the routine then proceeds to the web position table to determine for web 4 the black pages top and bottom to be assigned to the plate cylinders for the press unit 4. In doing this the routine will check for the web 4 position in the web position table is web position 4 in former 1 and in former 2. The routine will then, as above entered for former 1, the pages which have black thereon into the upper plate cylinders positions UA and UB in the print position table for work side and gear side of the former respectively. It will then proceed to check the bottom pages in the web position table for the bottom of the former of former 1 and enter these in lower positions LA and LB respectively for the gear side and work side location of the pages in the web position table. It will then proceed to check former 2 for web 4 and do the same entering but in the position UC, UD and LC, LD. When the routine assigns the colors to a web it will delete in the web color table the colors assigned in both the color code for the web and modify the total number of colors in the six position digit of N(6) to indicate the remaining colors to be assigned. In this case the numbers N(6) are modified to 0 in position $N_6$ to delete the black digits.

The routine then proceeds to press unit 4X in the print code and determines where web 1 is associated with the unit 4X and proceeds to check web 1 in the web position table and determines that there is one color remaining for web 1 and proceeds to the web color table and identifies web 1 as being in formers 1 and 2 and reads the top of the web for former 1 to determine the pages which are associated with the remaining color and enters the pages and section number into the print table positions UA and UB for gear side and work side respectively and then proceeds to the former 2 for the work side and performs the corresponding operation and deletes the total number of colors required for web 1 in the web position table.

The routine then proceeds to the lefthand units on the righthand side of the folder beginning with unit 5 and determines there is no web associated therewith. In proceeding to unit 6 (after first examining 5X as discussed below), which is identified in the print position table as a lefthand unit the routine will now assign in a regular print unit the lower cylinder to the top of the web and the top cylinder to the bottom of the web since the folder 10 is a righthand folder and the bottom of the web proceeding regularly through a right hand printing unit will be the top of the web in the folder.

After determining that the web 5 is associated with the printing unit 5X the routine will shift to the web color table for web 5 and will determine that the web is moving through the unit 5X in the normal direction so that the top of the web will be printed in the unit 5X and examines the color codes for the top of the web to determine which is not common to the bottom of the web. In the case of web 5, it will be determined that this color is blue and the routine will proceed to the web position table to determine the pages on the top of the web which have the color blue thereon and in determining these colors will enter them in the print table in the same manner as described before for half-deck 5X The routine will then delete the color digit for blue in the color number for the web 5. In examining the web position table the routine will have determined that the web 5 is a split web and will in addition examine the pages in the next web position table for web 5 to determine the blue pages on top of the web and to place these in the print table for positions UC, UD. The routine next proceeds to examine print unit 6X, determines there is no web associated therewith, and then makes the same determination for unit 7. On checking press unit 8 it makes the determination that the print unit 8 has web 4 associated therewith and enters web 4 into the print table in the web location for printing unit 8. The routine then proceeds to the web color table and determines that the unit 8 has a wrap therein where the upper and lower cylinders are both printing on the bottom of the web, which is the top of the web in the folders, and therefore proceeds to determine colors which are not common with the colors on the bottom of the web as it reaches the former and selects the first color which is not common for assignment to the lower plate cylinder and proceeds to check the web position table by former to determine the pages associated with this color for the top of the web, returns and deletes the color in the web color table and selects the next color which is not common, proceeds to the web table for the next color, assigns these plates to the print position table for pages of this color as described above, deletes this color from the color number for the units in the web color position table and proceeds to examine the unit 8X in the print table to determine the web associated therewith and once again determines that web 4 is associated therewith, enters web 4 in the web position associated with the print unit 8X in the print position table and proceeds to the web color table where it determines from the 8X designation in the color table that the web is to move normally therethrough, and proceeds to examine the color number for the digit on the top of the web not common with the bottom of the web and selects the next digit representing the remaining color and proceeds to the web position table for the formers to determine the pages for this color on the top of the web and enters these pages in the print position table in the manner previously described, and deletes the color from the color number in the web color table. The routine then proceeds to check the print unit 9 in the press configuration and determines that web 4 is associated with print unit 9, enters web 4 in the web position associated with print unit 9 moves to the web color table and at this time the web color table indicates that there is one color left for top and bottom and a check of the color numbers top and bottom indicates that the common color is black and then proceeds to the web position table to determine the pages top and bottom of the web for black and enters those into the print position table as previously described.

The routine is now finished and the end of the routine. This can be established by either providing a total number of webs in storage when the webs are initially computed or by flagging the last printing unit when webs are assigned, or by merely having print tables which correspond to the exact press configuration and examining all the print tables, all in accordance with conventional data processing technology. It can now be seen that the print position table has all the data stored therein necessary to print out a table by printing unit of the page locations. Moreover, this data may be readily rearranged, be addressed by section and page number to obtain the printing unit and cylinder location for any page.

Preferably the print table is to be addressable by page number to determine the plate locations in the printing press, i.e., the printing unit, the cylinder in the printing unit, and the plate position (A, B, C, or D) on the cylinder (upper U, lower L, or half deck X).

When the job is to be produced, this information is down loaded from the system store SS to the press control console 102 for use in making corrections in the ink control 110. In operation, corrections to the ink setting for the page can be entered by the operator in a known manner by specifying the page and correction to be made. The press control 102 will then transmit that information to the ink control 110 after determining from its table, addressable by section number and page, the plate location for the page.

APPENDIX A

| Statement Number | Press Description |
|---|---|
| 499 | The system has stored in memory press data for various press parameters. In the illustrated embodiment there are as follows: |

| Variable Name | Description |
|---|---|
| H1 | Total number of half-decks |
| U1 | Total number of units |
| LH | Total number of left-hand units |
| RH | Total number of right-hand units |
| AB | Number of angle bars |
| FT | 1 = left-hand folder<br>0 = right-hand folder |
| HD(I)I = 1 to LH or RH | For each half deck I, the corresponding unit number |
| RM | 0 = collect mode<br>1 = non-collect mode |
| F2 | 0 = Std. former (GS & WS)<br>1 = Balloon and Std. formers (GS & WS) |
| W1(I)I = 1 to U1 | W1(I) = 1 if unit I can be S-wrapped above<br>W1(I) = 0 otherwise |
| W2(I)I = 1 to U1 | WZ(I) = 1 if unit I can be S-wrapped below<br>W2(I) = 0 otherwise |
| FD | 0 = single folder delivery<br>1 = double folder delivery |
| R1 | Total number of reels |
| R1(I)I = 1 to U1 | Reel number I associated with unit number |
| B1 | Number of bay windows |

500 The instruction invokes a procedure which accepts the following user inputs, ED = edition number, TS = total number of sections, RM = run mode (collect or straight), CP = colored pages? (yes or no) and number of color pages for each section S(I) where I is 1, 2, . . . 8 for sections A, B, . . . H respectively and designated I,1, I2, . . . IN.

501 If the run includes pages with color Go To 502, otherwise, we only have black pages and Go To 1000.

502 This instruction invokes a procedure which accepts the following user input; S(I) = the section number (see statement 500), PN = page number, and NC = the number of colors and what they are.
NC is encoded as a 6 digit number: $X_1$, $X_2$, $X_3$, $X_4$, $X_5$, $X_6$, where:
$X_1$ = Number of colors (4,2,2,1)
$X_2$ = 1 if red, otherwise, 0.
$X_3$ = 1 if yellow, otherwise, 0.
$X_4$ = 1 if blue, otherwise, 0.
$X_5$ = 1 if black, otherwise, 0.
$X_6$ = 1 is special, otherwise, 0.

503 If the run includes pages with color then Go To 5000, otherwise, Go To 4000.

1000 <u>Rule for assigning section to formers</u>

1001 Required inputs include number of sections, number of pages in each section, and the folder configuration. Folder configuration includes whether the press includes balloon formers and whether the press has a double delivery system. Total number of printing units also.

1002 Rule: All presses should avoid the use of dinky rolls (¼ webs) since it is difficult to run their webs through the press. However, dinky rolls can be run if there is no way to change the input data.

1004 Determine the number of sections required.

1005 Paging for 6 and 8 sections if not checked during the entry routine.
For 8 sections #PGA must = #PGE
#PGB must = #PGF
#PGC must = #PGG
#PGD must = #PGH
Where #PG is number of pages in section and A, B, . . . H are section nos. Hence #PGA is number pages in section A.
For 6 sections (checked on entry of product description)
#PGA must = #PGD
#PGB must = #PGE
#PGC must = #PGF
This is true because if the number of sections is (6 or 8) then they must be run collect.

1006 Paging for 4 sections. If #PGSC = #PGSA and #PGSB = #PGSD then the job can be run collect using two formers. If not true the job must be run non-collect (straight) using four formers.

1007 For paging for 3 sections at least one section must contain pages evenly divisible by 4 in order to avoid use of dinky rolls. Each of these 3 sections should go to a single former.

1008 Paging for 2 sections. If pg A = pg B then job can be run collect or straight. Preference to be indicated on entry. However, for two sections, it is more advantageous to run straight because this doubles productivity. The only limiting factor involved is that enough printing units must be available. Divide the total number of pages by 8. If the result is less than or equal to the available units then the job is possible to run straight. Maximum paging of any section is 32. Color requirements may require that a shift back to collect at a later time. If running collect and wish to avoid running dinky rolls then total pages must be a multiple of 4 starting from a minimum of 8 and up to a maximum of 64. If the number of printing units is exceeded in trying to run straight and number of pages in A and B are not equal, then the job cannot be done.

1009 The only restrictions on running one section are that the total pages must be multiples of 4 starting at 4 pages and ending at 32 pages, if dinky rolls are to avoided. One section jobs must be run straight. If using dinky rolls the total pages can be multiples of 2 pages starting at 4 pages and end at 32 pages.¶If the folder has a double delivery then production can be doubled by running both folding couples straight. In this case total pages can be multiples of 2

APPENDIX A-continued starting at 4 pages and ending at 32 pages. Imposition will then be the same on the W.S. and G.S. of the press.

1010 If folder has double delivery then production can be doubled as described above for one section. Production can also be doubled when running 2 sections and 4 sections with a double delivery. When running 2 sections, if # page A equals # page B then the job can be run collect using the lower formers only, imposition on the W.S. and G.S. will be the same. If A and B are not equal, the job may be run by using all four formers running noncollect. If 4 section papers are to be run, then use of four formers and running collect will double production when using a double delivery. However # page A must = # page C and # page B must = # page D.

1011 Basic rule for assigning sections to formers is that the lower formers should carry the sections with the most pages in them. This information combined with the previous data will give 33 different folder arrangements. Combining the basic rule with other input data will result in selection of one of the following 33 arrangements.

| | | | | | | | | | |
|---|---|---|---|---|---|---|---|---|---|
| 8 Sections | WS | GS | WS | GS | WS | GS | WS | GS | |
| collect | H | F | E | E | G | F | G | E | UPPER FORMERS |
| | D | B | D | A | C | B | C | A | |
| (single delivery) | | | | | | | | | |
| | G | E | G | F | H | E | H | F | |
| | C | A | C | B | D | A | D | B | LOWER FORMERS |
| | (1) | | (2) | | (3) | | (4) | | |

6 sections collect (single delivery)

| | | | | | | | | | | | | |
|---|---|---|---|---|---|---|---|---|---|---|---|---|
| WS | GS | WS | GS | WS | GS | WS | GS | WS | GS | WS | GS | |
| | D | F | | E | | F | E | E | D | F | D | |
| | A | C | | B | | C | B | B | A | C | A | UPPER FORMERS |
| F | E | E | D | F | D | | D | F | | E | | |
| C | B | B | A | C | A | | A | C | | B | | |
| (5) | | (6) | | (7) | | (8) | | (9) | | (10) | | LOWER FORMERS |

4 sections straight (single delivery)

| | | | | | | | | |
|---|---|---|---|---|---|---|---|---|
| WS | GS | WS | GS | WS | GS | WS | GS | |
| D | B | C | B | D | A | C | A | UPPER FORMER |
| C | A | D | A | C | B | D | B | LOWER FORMER |
| (13) | | (14) | | (15) | | (16) | | |

4 sections collect (double delivery)

| | | | | |
|---|---|---|---|---|
| WS | GS | WS | GS | |
| D | D | C | C | UPPER FORMER |
| B | B | A | A | |
| C | C | D | A | LOWER FORMER |
| A | A | B | B | |
| (17) | | (18) | | |

4 sections collect (single delivery)

| | | | | |
|---|---|---|---|---|
| WS | GS | WS | GS | |
| D | | C | | UPPER OR LOWER FORMERS |
| B | | A | | |
| | (19) | | | |

3 sections straight (single delivery)

| | | | | | | | | | | | | |
|---|---|---|---|---|---|---|---|---|---|---|---|---|
| WS | GS | WS | GS | WS | GS | WS | GS | WS | GS | WS | GS | |
| | B | | A | B | | C | | C | B | C | A | UPPER FORMERS |
| C | A | C | B | C | A | B | A | | A | | B | LOWER FORMERS |
| (20) | | (21) | | (22) | | (23) | | (24) | | (25) | | |
| B | A | C | A | | | | | | | | | UPPER FORMERS |
| C | | B | | | | | | | | | | LOWER FORMERS |
| (26) | | (27) | | | | | | | | | | |

2 sections collect (single delivery)

| | |
|---|---|
| A | UPPER OR LOWER FORMERS |
| B | |
| (28) | |

2 sections collect double delivery

| | |
|---|---|
| A A | UPPER OR LOWER FORMERS |
| B B | |
| (29) | |

2 sections straight single delivery

| | |
|---|---|
| A B | UPPER OR LOWER FORMERS |
| (30) | |

2 sections straight double delivery

| | |
|---|---|
| A B | UPPER FORMERS |
| A B | LOWER FORMERS |
| (31) | |

1 section straight single delivery

| | |
|---|---|
| A | A UPPER OR LOWER FORMER |
| (32) | |

1 section straight double delivery

| | |
|---|---|
| A A | UPPER OR LOWER FORMERS |
| (33) | |

2000 Rules for Identifying the Size of Each Web in each Former section.

2001 If the upper two formers have equal number of pages or the lower two formers have equal number of pages then two cases exist.

a. If the number of pages in a section is divided by 4 and the fractional part of the answer is .0, then all webs in the former section are full webs.

b. If the number of pages in a section is divided by 4 and the fractional part of the number is .5, then the bottom web in the former section is $\frac{1}{2}$ web centered on the center line of the press. All other webs required are full webs.

2002 If in either the upper or lower pair of formers the number of pages in one former exceeds the number of pages in the other former pair either an upper or lower pair of formers by 2, then 2 different cases exist.

a. .If the sum of the number of pages in the two different formers divided by 8 gives a fractional remainder of .75, then the bottom web of the former is a $\frac{3}{4}$ web and the remaining webs are full webs. If the section with 2 fewer pages is on W.S. former then the $\frac{3}{4}$ web is centered on the G.S. former. If APPENDIX A-continued the section with 2 fewer pages is on the G.S. former then ¾ web is centered on W.S. former. The number of full webs is equal to the result of the division operation minus .75.

b. If the sum of the number of pages in the two different sections divided by 8 gives a fractional remainder of .25, then the bottom web on the former section is a ¾ web, the next web up is a ½ web and all remaining webs are full webs. If the section with two more pages is on the W.S. former the ¾ web is centered on the G.S. former and the ½ web is centered on the W.S. former. If the section with two more pages is on the G.S. former the ¾ web is centered on the W.S. former and the ½ web is centered on the G.S. former. The number of full webs is equal to the result of the division operation minus 1.25.

2003 If the number of pages in two different sections in the same upper or lower former pair are not equal then three different cases exist when the difference is not 2. (If different by 2 pages see para. 1002).

A. Divide the number of pages in each different section by 4:
(1) If both remainders are .0 then no ¾ webs are required. Subtract the numbers obtained above from each other. This number will be equal to the number of ½ webs required and remaining webs will be full webs. The side the ½ webs are centered on is determined by the sign of the above equation. The number of full webs is equal to the lower of the two values found in the division operation above.
(2) If one fractional remainder is 0 and the other remainder is .5 one ¾ web will be required. Subtract the two values obtained above from each other and then take the absolute value. Subtract .5 from this number. This result is equal to the number of ½ webs required. The ½ webs will be centered on the former with the most pages. The ¾ web will also be centered on the same side as the ½ webs. Sum the number of pages in the two former sections and subtract 6. Subtract 4 times the number of ½ webs needed. Divide this number by 8. This equals the number of full webs. If the result has a fractional remainder of 0.5, subtract 0.5 from the result and add 1.0 to the number of half webs required.
(3) If the fractional parts of the answers are both .5 then (2) ¾ webs will be needed. Subtract the two values above and take the absolute value. This quantity equals the number of ½ webs. Sum the number of pages in the two former sections and subtract 12. Subtract 4 times the number of ½ webs needed. Divide this number by 8. The result is the number of full webs. This will result in two different conditions. The result of the previous calculation is equal to the number of full webs.

a. If the number of full webs was found to be zero then (one) ½ web should be positioned on top of the former with the most pages. The next web is a ¾ web centered on the former with the least pages. The next web is the other ¾ web centered on the former with the most pages. Below these webs the additional ½ webs are positioned on the former with the most pages.

b. If the number of full webs is not zero then the full webs are positioned on top of the formers. Next the 1st ¾ web is positioned on the former with the greatest number of pages followed by the 2nd ¾ web positioned on the opposite former. These webs are followed by the remaining ½ webs positioned on the former with the most pages.

3000 Rules for assigning Page Numbers to Webs.

3001 There are eight different printed page numbers for a full web, six different page numbers for a ¾ web, four different page numbers for a ½ web and 2 for a quarter web.

3002 A full web contains four sections when running collect and two sections when running straight. A ¾ web contains four sections when running collect and two sections when running straight. A ½ web contains two sections when running collect and one section running straight when the web is centered on any former. When a ½ web is centered on the centerline of the press the web contains four sections when running collect and two sections when running straight.

3003 When numbering pages each page must be identified with a former, web, top or bottom of the web, and position on the web (G.S. or W.S.). Page 1 is (of any section) always on the top of the first web of a section on the G.S. of the former. The last page of the section is always on the top of the first web of a section on the W.S. of the former.

3004 Page numbers on the G.S. of the former increase by one from page 1, first going to the bottom of the first web then to the top of the second web, then to the bottom of the second web, to the top of the third web, etc. until all page positions on the web are filled.

3005 Page numbers on the W.S. of the former decrease by one from the top of the first web to the bottom of the first web then to the top of the second web, etc. until you run out of webs to put numbers on.

3006 If when numbering a page, a web position is encountered that has no web in it, simply skip down to the next web position.

3007 Imposition must be written for all sections. If two sections are on the same former then the only difference in imposition between the two sections is the section identification.

3008 Each web on each former should be tabulated with the page numbers top and bottom for reference at a latter time.

4000 Number of Units Assigned to Upper and Lower Folders for Black.

4001 Divide the number of pages in former number 3 by 4. The result is the number of units for black only required to run that paging through former number 3. If the answer has a fractional part of .5 then add .5 to the answer to get the whole number of units required for former number 3.

4002 Make the same calculation for former number 4, dividing the number of pages in one section of former number 4 by 4. The result is the number of units required to run the paging of former number 4. Again, if the result has a fractional part of .5 add .5 to the answer. This will be the whole number of units required for former number 4.

4003 Compare the results of calculations 4001 and 4002 above. The higher number of units determines the number of units to be assigned to the upper formers for black and white pages.

4004 Run the same calculations described in 4001, 4002 and 4003 above for formers number 1 and 2. The result obtained will give the number of units required for the lower formers.

4006 An input that allows only 2 pages in a section cannot be run.

5000 Determining How Many Units Are Needed Per Web.

5001 Examine each web for color on each former.

5002 Start with the upper formers first and then the lower formers.

5003 Unit requirements for color for each web:

a. 4 colors on top and 1 color on bottom - requires 2 full units and 1 half deck minimum.
b. 4 colors on top and 2 colors on bottom - requires 3 full units.
c. 4 colors on top and 3 colors on bottom - requires 3 full and 1 half deck minimum.
d. 4 colors on top and 4 colors on bottom - requires 4 full units.
e. 3 colors on top and 1 color on bottom - requires 2 full units.
f. 3 colors on top and 2 colors on bottom - requires 1 full unit and 1 half deck minimum.
g. 3 colors on top and 3 colors on bottom - requires 3 full units.
h. 3 colors on top and 4 colors on bottom - requires 3 full units and 1 half deck minimum.
i. 2 colors on top and 1 color on bottom - requires 1 full unit and a half deck.
j. 2 colors on top and 2 colors on bottom - requires 2 full units.
k. 2 colors on top and 3 colors on bottom - requires 2 full and 1 half deck minimum.
l. 2 colors on top and 4 colors on bottom - requires 3 full units.

APPENDIX A-continued m. 1 color on top and 2 colors on bottom - requires 1 full unit and one half deck.
n. 1 color on top and 3 colors on bottom - requires 2 full units.
o. 1 color on top and 4 colors on bottom - requires two full unit and a half deck minimum.
p. 1 color on top and 1 color on bottom - requires one full unit.

5004 From this information the number of units required per web is found. Sum up the number of units and ½ decks needed per former at this point. This tells how many units are required per former.

5005 Sum up the number of full units needed for the formers, also sum up the number of ½ decks needed for the formers. If any of these numbers exceeds the capacity of the press then the job cannot be done at all.

6000 Web Routing Procedure

6001 The web routing procedure has, as input, the number of webs in the product; the number of colors on the top and bottom of each web; and the sequence in which the webs would appear in the folder:

```
______________w(k,i,j)
_____ 1 _____
      1
      1
      1
_____ 1 _____w(2,i,j)
______________w(1,i,j)
```

6002 The webs are designated 1 through K where web 1 is the lower most and WK has the front or outside pages. For each web, the number of colors on the top of the web is designated "i" and the bottom of the web "j".

6003 The number of webs required to produce the product is subject to the constraint that the total number of colors, w(1,i)+w(2,i)+'''+w(k,i)+w(1,i)+w(2,i) '''+w(k,j), must not exceed the number of plate cylinders available in the press. Because of certain assymetrics in the configuration of a give press, some color specifications may constrain the size of the product to fewer webs than can be accommodated by the total number of plate cylinders available.

6004 The procedure begins by routing if the folder is right-handed the first web, wl, to the first right-hand unit(s) to the left of the folder; or to the first left-handed unit(s) to the right of the folder if the folder is left-handed. FIG. 1 depicts the situation for a right-handed (as observed from the work side) folder. If web one is routed successfully, the last web, wk, is routed to the first unit(s) on the opposite side of the folder. The procedure is continued, alternating between the units on either side of the folder until all webs have been routed.

6005 In the event that some webs cannot be routed to the anticipated side of the folder, the routing process is re-started by "borrowing" unit(s), via the under folder web lead to either wl or wk (see FIGS. b and c).

6006 The routing of a particular web is accomplished using three tables: (1) the left-hand configuration table B, (2) the right-hand configuration table A, and (3) the print unit 1 half-deck usage table. First the color requirements of wl are determined (1,1), 1,2), - - -, (1,4), (4,1) - - -). Then the required print unit(s) / half-deck(s) are determined from one of the tables A or B. Finally, the print unit/half-deck usage table is searched (either from M up or N down) to find the first combination of print unit(s)/half-deck(s) that can print the required color. If a configuration is located, it is recorded and the web is routed. The table is marked to indicate which printing units/half-decks were used. If a configuration cannot be located, the table is cleared and one of the alternate configurations is attempted.

TABLE A

| 6006 Bot. | TOP OF WEB | | | |
|---|---|---|---|---|
| Web | 1c | 2c | 3c | 4c |
| 1c | N | N·Nx* | (N−1)**·N | (N−1)**·N·NX* |
| 2c | (N−1)·NX | (N−1)·N | (N−1)·N·NX* | (N−2)**·(N−1)·N |
| 3c | (N−1)*·N | (N−1)*·N·NX* | (N−2)·(N−1)·N | (N−2)·(N−1)·N·NX* |
| 4c | (N−1)·N*·NX | (N−2)*·(N−1)·N | (N−2)**·(N−1)·N*·NX | (N−3)·(N−2)·(N−1)·N |

(A) Right-hand units into a right-hand folder (exchange "top" and "bottom" designations for right-hand units into a left-hand folder). N identifies the first unit to the left of the folder that meets the unit requirements set forth herein. N-1 identifies the next succeeding unit that meets the unit requirements and so forth. With reference N−1 FIG. 6, N = unit 4 and N−1 = unit 3.

TABLE B

| 6005 Bot. | TOP OF WEB | | | |
|---|---|---|---|---|
| Web | 1c | 2c | 3c | 4c |
| 1c | M | MX·(M+1) | M·(M+1)* | MX·M*·(M+1) |
| 2c | M·MX* | M·(M+1) | MX*·M·(M+1)* | M·(M+1)·(M+2)* |
| 3c | M·(M+1)** | MX*·M·(M+1) | M·(M+1)·(M+2) | MX·(M+1)·(M+2)(M+3) |
| 4c | MX*·M·(M+1)** | M·(M+1)·(M+2)** | MX*·M·(M+1)·(M+2) | M·(M+1)·(M+2)·(M+3) |

(B) Left-hand units into a right-hand folder (exchange "top" and "bottom" designation for left-hand units into a left-hand folder). M TABLE B-continued

| 6005 Bot. | TOP OF WEB | | | |
|---|---|---|---|---|
| Web | 1c | 2c | 3c | 4c |
| | identifies the first unit to the right of the folder that meets the unit requirements set forth herein. M+1 identifies the next succeeding unit that meets the unit requirements and so forth. With reference to FIG. 6, M = unit 5 and M+1 = unit 6. | | | |
| TABLES (A) and (B) - printing unit/half deck configurations required to print webs from 1/1 to 4/4 colors. | | | | |

*Upper "S" WPAP
**Lower "S" WPAP
MX* Backwards Through Half Deck

| | |
|---|---|
| 7000 | This is a procedure which generates a graphical display of the webbed-up press. The normalized cortesian coordinates for each webbing (see statement 6000) was manually generated and this representation is translated to the assigned unit number(s). |
| 8000 | This is a procedure which generates a product detail based upon the webbing imposed upon the press. The product detail display yields, for each unit, the web number passing through the unit and the plates assigned to the upper and lower plate cylinders. The plating takes into account whether we are dealing with a half-deck or a full unit, a right-hand or a left-hand unit and if the web is S-wrapped above or below or straight through. |

What is claimed is:

1. In a method of making ready a multi-unit, multi-web printing press for printing a publication and prior to operating the press, the steps of:

entering data into an electronic data processing apparatus, said data representative of the number of pages for each section and which pages of each section are to be printed in one or more colored inks;

determining and providing from the inputted data as well as from previously stored layout information in said apparatus particular to said press and its configuration, output data representing acceptable page printing plate positions on the various plate cylinders of the press;

providing a readout in accordance with the outputted data providing information showing the correct page printing plate positions on the various plate cylinders of the press for producing the publication defined by said readout.

2. In a method as set forth in claim 1 wherein said step of entering data includes manually manipulating data entry keys for entering data.

3. In a method as set forth in claim 1, wherein said step of providing a readout includes providing a permanent record print out.

4. In a method as set forth in claim 1 including the further steps of positioning the page plates on the various plate cylinders of the press in accordance with the plate position instructions provided by said readout.

5. In a method as set forth in claim 4, wherein said step of positioning is accomplished manually in accordance with said plate position instructions.

6. In a method as set forth in claim 5, including the step of providing said instructions as a print out.

7. In a method as set forth in claim 1 wherein said output data includes information regarding a web layout for the publication defined by the entered data and including the steps of:

Utilizing said output data for providing a first video display such that the video display provides a graphical depiction of the multi-unit press and showing the number of webs required and the manner in which they should be laid out to produce the publication to be printed.

8. In a method as set forth in claim 1 including the further step of:

providing a second video display of alphanumeric characters showing product details for the publication to be printed by describing the correct plate positions on the various plate cylinders for printing each page of the various sectons.

9. Apparatus for use in making ready a multi-unit, multi-web printing press for printing a publication and prior to any printing operations, comprising:

means for entering data into a computer memory representative of the number of sections of a publication to be printed by the press, the number of pages for each section and which pages of each section are to be printed in one or more colored inks;

programmed computer means including said memory for determining and providing from the inputted data as well as from previously stored layout information particular to said press and its configuration, output data representing acceptable page printing plate positions on the various plate cylinders of the press; and means for providing a read-out in accordance with the outputted data providing the information showing the correct page printing plate positions on the various plate cylinders of the press.

10. Apparatus as set forth in claim 9, wherein said means for entering data includes keyboard means having manually operable data entry keys.

11. Apparatus as set forth in claim 9, wherein said output data includes information regarding a web layout for the publication defined by the entered data and said readout providing means includes video display means responsive to said output data for displaying a graphical depiction of a multi-unit press showing the number of webs required and the manner in which they should be laid out to produce the product to be printed.

12. Apparatus as set forth in claim 11 including printing means responsive to said output data for providing a print out in accordance with the said graphical depiction.

13. Apparatus as set forth in claim 9, wherein said readout providing means includes video display means for displaying alphanumeric characters showing product details for the product to be printed including information as to correct plate positions on the various plate cylinders for printing the pages of the various sections of the publication.

14. Apparatus as set forth in claim 13, including printing means for providing a print out showing said product details.

15. Apparatus as set forth in claim 9 including means responsive to said outputted data for effecting mechanical adjustments to said press dependent upon said outputted data.

16. Apparatus as set forth in claim 15, wherein said responsive means includes control means responsive to said outputted data respecting said page printing plate position information for effecting mechanical adjustments to said press dependent thereon.

17. Apparatus as set forth in claim 16, wherein said control means includes ink flow control means for effecting adjustments to said press to adjust ink flow.

18. A method of making ready a multi-unit, multi-web printing press, comprising:

entering into electronic data processing apparatus data representative of the number of sections of a publication to be printed by the press, the number of pages for each section and which pages of each section are to be printed in one or more colored inks;

providing for the data processing apparatus layout information particular to the printing press, the information being stored in said apparatus for processing the entered data to define a set of printing plate positions suitable for producing by means of the press the publication defined by the entered data; and utilizing said data processing apparatus to process the entered data in accordance with the layout information so as to provide a readout indicative of a set of printing plate positions suitable for producing the publication defined by the entered data.

19. A method for making ready a multi-unit, multi-web printing press, comprising:

entering into electronic data processing apparatus data representative of the number of sections of a publication to be printed by the press, the number of pages for each section and which pages of each section are to be printed in one or more colored inks;

providing for the data processing apparatus a set of layout rules particular to the printing press, the rules being stored in said apparatus as a programmed sequence of data processing steps for operating on the entered data to define a set of printing plate positions suitable for producing by means of the press the publication defined by the entered data;

utilizing said data processing apparatus to operate upon the entered data with said programmed sequence of data processing steps so as to provide output data indicative of a least a set of printing plate positions suitable for producing the publication defined by the entered data; and installing printing plates in the press in accordance with said output data so as to prepare the press to print the publication.

20. Apparatus for making ready a multi-unit, multi-web printing press for printing a publication, the apparatus including:

means for entering data into a data storage means, said data representative of the number of sections of a publication to be printed by the press, the number of pages of each section and which pages of each section are to be printed in one or more colored inks;

said data storage means pre-programmed with layout information particular to the printing press, for processing the entered data to define a set of printing plate positions for producing by means of the press the publication defined by the entered data;

processing means for processing the entered data with said layout information so as to provide output data indicative of a set of printing plate positions suitable for producing the publication defined by the entered data; and means for providing a read out of said output data to provide installation instructions for positioning the printing plates in the press to print said publication.

21. A multi-unit, multi-web printing press having associated therewith electronic data processing apparatus for use in making the press ready for printing a publication, the data processing apparatus including:

means for entering data representative of the number of sections of a publication to be printed by the press, the number of pages of each section and which pages of each section are to be printed in one or more colored inks;

data storage means pre-programmed with a set of layout rules particular to the printing press including rules for determining web layout patterns and printing plate positions dependent upon the entered data respecting the number of sections, the number of pages in each section, and which pages in each section are to be printed in color, said rules being particular to the printing press including its number and location of printing units, the number of its formers and their location, and the number of its four color printing units, the rules being programmed as a sequence of data processing steps for operating on the entered data to define a web layout pattern and a set of printing plate positions suitable for producing by means of the press the publication defined by the entered data;

processing means for operating on the entered data with said programmed sequence of data processing steps respecting said layout rules so as to provide output data indicative of at least a web layout pattern and a set of printing plate positions suitable for producing the publications defined by the entered data; and means for providing a readout of said output data to provide installation instructions for positioning the printing plates in the press to print said publication.

22. In a method of making ready a multi-unit, multi-web printing press for printing a publication and prior to operating the press, the steps of:

entering data into an electronic data processing apparatus, said data representative of the number of pages for each section and which pages of each section are to be printed in one or more colored inks;

storing in a memory in said apparatus layout information particular to said press and its configuration said layout information including a set of rules for determining web layout patterns and printing plate positions dependent upon the entered data respecting the number of sections, the number of pages in each section and which pages in each section are to be printed in color, said rules being particular to the printing press including its number and location of printing units, the number of its formers and their location, and the number of its four color printing units;

determining and providing from the inputted data as well as from said previously stored layout information in said apparatus particular to said press and its configuration, output data representing a web layout pattern and acceptable page printing plate positions on the various plate cylinders of the press; and providing a readout in accordance with the output data providing information showing the web layout pattern and the correct page printing positions on the various plate cylinders of the press for producing the publication defined by said readout, said readout including a visual display graphically illustrating said press and the said web layout pattern.

23. A multi-unit, multi-web printing press having associated therewith electronic data processing apparatus for use in making the press ready for printing a publication, the data processing apparatus including:

means for entering data representative of the number of sections of a publication to be printed by the press, the number of pages of each section and which pages of each section are to be printed in one or more colored inks;

data storage means pre-programmed with a set of layout rules particular to the printing press including rules for determining web layout patterns and printing plate positions dependent upon the entered data respecting the number of sections, the number of pages in each section, and which pages in each section are to be printed in color, said rules being particular to the printing press including its number and location of printing units, the number of its formers and their location, and the numnber of its four color printing units, the rules being programmed as a sequence of data processing steps for operating on the entered data to define a web layout pattern and a set of printing plate positions suitable for producing by means of the press the publication defined by the entered data;

processing means for operating on the entered data with said programmed sequence of data processing steps respecting said layout rules so as to provide output data indicative of at least a set of printing plate positions suitable for producing the publication defined by the entered data;

system storage means for storing said output data for subsequent retrieval;

press control means for retrieving said output data from said system storage means, said press control means providing control signals for controlling ink key control means so as to vary ink key settings dependent upon said retrieved output data; and ink key control means responsive to said control signals provided by said press control means to vary said ink key settings.

* * * * *